United States Patent
McNamara, Jr.

(10) Patent No.: US 11,716,312 B1
(45) Date of Patent: Aug. 1, 2023

(54) PLATFORM FOR OPTIMIZING SECURE COMMUNICATIONS

(71) Applicant: Hopr Corporation, Columbia, MD (US)

(72) Inventor: Thomas M. McNamara, Jr., Ellicott City, MD (US)

(*) Notice: Subject to any disclaimer, the term of this patent is extended or adjusted under 35 U.S.C. 154(b) by 121 days.

(21) Appl. No.: 17/472,799

(22) Filed: Sep. 13, 2021

Related U.S. Application Data

(63) Continuation-in-part of application No. 16/015,923, filed on Jun. 22, 2018, now Pat. No. 11,151,243.

(51) Int. Cl.
| | |
|---|---|
| G06F 7/04 | (2006.01) |
| G06F 15/16 | (2006.01) |
| H04L 29/06 | (2006.01) |
| H04L 9/40 | (2022.01) |
| H04L 9/08 | (2006.01) |

(52) U.S. Cl.
CPC ........ H04L 63/0428 (2013.01); H04L 9/0861 (2013.01)

(58) Field of Classification Search
CPC .......................... H04L 63/0428; H04L 9/0861
USPC ............................................................ 726/6
See application file for complete search history.

(56) References Cited

U.S. PATENT DOCUMENTS

| | | | |
|---|---|---|---|
| 10,122,699 B1* | 11/2018 | Ellingson | H04L 63/04 |
| 2009/0281948 A1* | 11/2009 | Carlson | G06Q 40/00 |
| | | | 379/88.04 |
| 2015/0372811 A1* | 12/2015 | Le Saint | G06Q 20/3829 |
| | | | 705/76 |
| 2019/0380033 A1* | 12/2019 | Wu | H04W 12/069 |

* cited by examiner

*Primary Examiner* — Jeffrey C Pwu
*Assistant Examiner* — Samuel Ambaye
(74) *Attorney, Agent, or Firm* — John L. Sotomayor

(57) ABSTRACT

The present invention is a system and method for machine-to-machine communication in a Zero Trust environment, through the use of repeated, dynamic, and automated transformation and manipulation of strings of printable or typeable characters that are commonly used for passwords, PINs, keys, tokens, keys, encryption, and filenames forming a class of printable strings. The system and method described makes use of secured password "Hopping" to maximize data security and user's ease of implementation. "Hopping" refers to a method of automated random-password construction and serial substitution. The instant invention uses a protocol to create an immutable interdependence between a machine identity credential and a key credential as each is rotated from session to session.

18 Claims, 21 Drawing Sheets

FIG. 13    1300

PLATFORM FOR OPTIMIZING SECURE COMMUNICATIONS

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

CROSS-REFERENCE TO RELATED APPLICATION

This application claims the benefit of priority of U.S. Non-Provisional application Ser. No. 16/015,923 filed Jun. 22, 2018, entitled "Password Hopping System and Method" which is herein incorporated in its entirety.

BACKGROUND

This innovation relates generally to digital "passwords" used to limit access to privileged data. The term "passwords" represents a broad class of printable character strings that form the basis of digital or electronic protection. This includes passwords, personal identification numbers (PINs), keys, tokens, encryption seeds, filenames, and directory or folder names.

Password use is a common and widespread "access control" convention used wherever electronic transactions between two parties occur or trusted access to information is necessary. Passwords are essential in processes to "authenticate" a user in a transaction and are intended to be secret. Access to information results when a user that has been previously authorized or registered with a second party is permitted by the authenticator to have access to information guarded by any access control system or methodology.

Password security practices and de-facto standards are based on a philosophy of "strength", which may be viewed as complexity and length of the password, to achieve a valid user authentication. This approach results only in the appearance of security. When sensitive information is combined in a single database of a closed network, an intruder only needs to find the weakest authentication credentials to penetrate secure areas of the network and have access to the entire filesystems maintained on one or more computer systems. Security from strong passwords is only achievable if every password is strong and kept secret.

Password selection is a user choice, is subject to password theft or unauthorized disclosure, and has been the root cause for many high-profile and large data breaches. Once a breach occurs and a credential database can be removed from a closed network, computing technology and the ingenuity of hackers can "crack" encryption features rather quickly. Thus, all security is lost—even for a user who used strong passwords.

The desire of users for simplicity and convenience leads users to select weak, reused, or old passwords. Such user behavior undermines authentication security policies and practices. Most users are unable to remember complex and long password strings, increasing user frustration and user avoidance of recommended password security practices. Exposure of private and sensitive information from weak, stolen, old, unauthorized, or cracked passwords results in serious privacy and economic consequences including lost customer privacy and identity theft for the user, and regulatory penalties, brand erosion, and high remediation costs for business.

The trend for the past decade has been the increased imposition of security requirements on user's passwords, such as length, character types, scheduled password expiration, restricting password reuse, by authenticators. More recently, industry has introduced new technology to allow additional "factors" such as biometric data validation to be used to authenticate a user. Nonetheless, passwords remain as the ubiquitous and primary method of authentication for the majority of Internet and business users.

To manage the difficulty with remembering many passwords and creating strong passwords, industry has introduced password managers as a way for users to create longer complex passwords and store them on their computers and mobile devices or 'cloud' servers. Also, popular web browsers integrate a password manager to allow users to save a password at the time they register on a website. The password is stored, although sometimes not securely, and automatically recovered and submitted in authentication forms when the user returns to a site's login page.

Another existing solution is the use of soft and hard tokens that augment the use of a password. The token is generated for one-time use and provided to the user. When in use, the token is usually sent to a user's phone as an SMS message or via a mobile app or alternatively via a separate hardware device that displays the short one-time code. The token must accompany the password for authentication of the user. This process is one example of two-factor authentication.

Yet another solution is the use of fingerprints as a biometric method to authenticate a user. Other biometric data may include iris scans, voice printing, and facial recognition. Still other methods include behavior monitoring where a user's interactions with their computing device are monitored for comparison with prior history.

Because of the persistence and success of cyber-criminals and nation-state actors in breaking traditional security boundaries, avoiding detection mechanisms, hiding from tracking tools, and gaining unauthorized access to formerly trusted networks, data, and applications, the principles of Zero Trust have emerged as a central security model for digital organizations. Many organizations are moving away from on-premises applications and data centers to the cloud delivery model. As critical business systems and data move to the cloud, new software architectures (such as microservices and serverless) are used to increase efficiency and lower costs for increased competitiveness.

One trend is to use smaller and smaller applications with application programming interfaces (APIs) for intercommunications. Approaches such as microservices and serverless architectures are replacing legacy monolithic applications. The practice of DevOps and DevSecOps has also emerged as an agile software development method to speed the introduction of production software into operations.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1A:
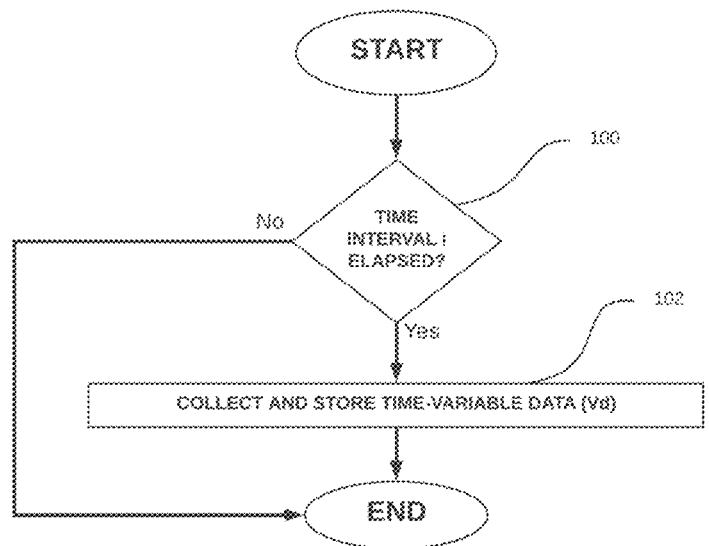
FIG. 1A is a process flow diagram for the password creation and communication of the same by an Algorithm Server to an Authentication Server consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The terms "paired" and/or "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "device" refers to any electronic device with network communication access such as, but not limited to, a cell phone, smart phone, tablet, iPad, networked computer, internet computer, laptop, watch or any other device, including Internet of Things devices, a user may use to interact with one or more networks or represent an endpoint of user interactions.

Reference herein to "Hopping" refers to a method of automated random-password generation and serial substitution at specified time intervals. The process of "Hopping" as described herein is based upon a hopping algorithm comprised of a specified time interval and a set of specified construction and transformation rules that employ, among other variables, easily available time-variable data sources as providers of randomized inputs. Use of randomized inputs heightens the security of resulting generated passwords.

Throughout this document the terms "dynamic data," "dynamic information," and "time-variable data" are used interchangeably.

Reference herein to TPV refers to "Third Party Vendor."

Reference herein to "Algorithm" is nearly synonymous with the term 'formula' as used herein, with the distinction that human users can remember a formula, but machines must store and run an algorithm.

Reference herein to "Authorization" refers to the permissions and privileges (authorities) granted to identities to access data or operate machines in a cloud computing environment.

Reference herein to "CHIPS™" refers to the acronym standing for, "Codes Hidden In Plain Sight" and applied to a proprietary computer security method using dynamic information hidden in plain sight to construct a dynamic password.

Reference herein to "Special Device" refers to a subclass of machines that interact with other cloud machines, usually from a cloud perimeter or edge endpoint. Special Devices may include mobile and wireless computing devices, IoT devices such as mechanisms and controllers, and network devices such as on premises computers and servers in an enterprise.

Reference herein to "Endpoint" refers to a digital address for a workload operating in the cloud, such as a URL or URI that may be used by an API workload to receive requests for services.

Reference herein to "Ephemeral Symmetric Secret" refers to a symmetric key built from an Identity's CHIPS algorithm. The secret "hops," or changes, each time a session begins. The Ephemeral Symmetric Secret encrypts only communication between SAMI Session Manager and a specific workload Sidecar.

Reference herein to "Identity" refers to a specific human, business, computing infrastructure, application, or service that interacts with one or more other humans, businesses, computing infrastructures, applications, or services.

Reference herein to "Machine" refers to a class of cloud computing and infrastructure hardware and software items that possess identity. A machine may be any one of: applications, services, containers, virtual machines, and devices or Special Devices that interconnect in a cloud computing environment.

Reference herein to "Secret" refers to a password, pin, token, key or any string of printable characters whose possession is used to prove an authenticated identity and must be kept secret by the authorized users.

Reference herein to "Session" refers to a series (either synchronous or asynchronous) of machine-to-machine interactions that occur for a specific purpose and limited period of time.

Reference herein to "Session Token" refers herein to a key that encrypts messages between two machine Sidecars during a session. The key has a limited lifetime and is issued simultaneously to each of the two machine Sidecars.

Reference herein to "Sidecar" refers to lightweight plugin code that resides with a workload to perform the SAMI functions at the workload endpoint and interoperate between the workload and the SAMI platform that is acting as a Session Manager and also communicate with other Sidecars.

Reference herein to "Workload" refers to a generic category of functioning machines in temporary operation within cloud computing. For example, an application running on a container in a cloud data center is a workload.

Reference herein to "Zero Trust" refers to an evolving set of cybersecurity paradigms that move defenses from static, network-based perimeters to focus on users, assets, and resources. The evolving set includes principles such as "deny all" access defaults and "zero standing privileges" for authorized identity permissions. The Zero Trust approach advocates mutual authentication, including checking the identity and integrity of Special Devices without respect to location, and providing access to applications and services based on the confidence of Special Device identity and Special Device health in combination with user authentication.

Reference herein to "Secret Zero" refers to the initial, root, or base secret (for instance, by way of non-limiting example, a key or password) that safeguards access to other secrets used to authenticate access. Secret Zero may be a password that authenticates a human computer systems administrator.

Reference herein to the term "SAMI" refers to an acronym for "Secrets, Authentication, and Machine Identity," and is a top-level reference for the instant innovation including management and rotation of machine identities, management and rotation of machine secrets, brokering and managing sessions between machines in various public and private clouds and encryption of inter-machine communications.

Reference herein to "hopr" refers to a trademark and/or registered trademark used and owned by "hopr Corporation."

The desire of users for simplicity and convenience in their own access to protected digital data often leads to weak, reused, or old passwords. By its very nature, use of weak, reused, or old passwords undermines existing authentication security policies and practices.

A recent report by Cyber Ventures, Ltd. estimates " . . . more than 3 billion user credentials and passwords were stolen in 2016, with 8.2 million passwords being stolen every day and approximately 95 passwords stolen every second." Security experts have advocated extensively on the need for stronger password habits and federal recommendations have been established for commercial businesses that collect and safeguard personal identifying information (PII). Most users are unable to remember complex and long password strings, increasing their frustration and avoidance of the recommended password security practices. Exposure of private and sensitive information from weak, stolen, old, unauthorized, or cracked passwords results in serious privacy and economic consequences to users and businesses.

As a method of security access for a broad base of users, in all systems that must be accessed remotely, passwords are ubiquitous. A recent study estimated that over 75 billion passwords are used online today (within both public and private networks), and this number is expected to grow to nearly 300 billion by 2025, largely from an increase in IoT devices. Passwords may also be a problem. They are meant to allow access to authorized individuals only but are failing to achieve this purpose. The clearest evidence of this is the ever-increasing number and size of reported data breaches and the growing frequency and number of exposed login credentials sold online. Over 1300 data breaches were reported in the US last year. Many of these exposed personal data such as email user names and passwords for sale on the "dark web." One estimate is that breaches have exposed more than 4.8 billion passwords for sale online. This horde of login credentials has led to "credential stuffing" as a new exploit for hackers and cyber-criminals to breach security at yet more online sites. The easy availability of a large number of email addresses and passwords also promotes increased ransomware attacks.

There is a reason why passwords are so widely used and accepted. They are personal, private, easily replaced, easy to remember, accepted as reliable for most authentication purposes, and are low-cost to implement. However, they are also static, easily misused, may be weak (short, familiar, or easily guessed), re-used, lost, and stolen. To overcome these issues, many security managers introduce password policies to avoid weak and old passwords. But these policies have not proven to be effective and have introduced "security fatigue" as Users are unable to comply with the onerous and ineffective password creation requirements issued by security managers. Additionally, many password authentication systems in use by businesses rely on old technology, lack up-to-date security patches, or are poorly configured and poorly administered by businesses. These introduce significant vulnerabilities to business systems and risk the privacy of customer data. In addition, business employees who use the same passwords for business and personal logins, which is a common practice, add further risk.

Although other solutions to the password problem may exist today, some of these solutions also introduce new problems that may be worse than today's password problem.

As an example, Password Managers offer Users a digital wallet or vault to store and protect their passwords and retrieve them with a master password. Some create random, strong, passwords for the user, reset passwords automatically at certain sites, and autofill password fields on web site login pages via the User's web browser. Although some of these features provide convenience, they also introduce security vulnerabilities. Since the passwords contained in a password manager are static, a user's risk of loss due to a data breach is not lessened because many breaches exist for months or years before they are detected. And, of course, the loss of the master password to theft or misuse exposes all passwords to loss from a single event.

One-Time Tokens are short codes that are provided to a User by either a hardware device, such as a fob, or a software device, such as a smartphone application, or an SMS text message. One-time tokens are not a complete replacement for passwords, but rather augment the password by adding a second factor of authentication (2-factor authentication or "2FA). While providing stronger authentication security, 2FA is not widely adopted. 2FA requires a hardware device which adds cost to the security solution, interrupts the login experience, particularly for smartphone apps, and authentication is blocked if your device is not physically located with you.

Biometric authentication may use sensors already present on a user's hardware device(s) to collect personal information such as fingerprints, facial recognition, voice recognition, iris scanning, and others. Biometrics might appear to provide strong authentication security, but research shows they can be spoofed and biometric data is generally public rather than private, so it is easily collected. There is also a significant public concern with loss of privacy, trust of data storage, and irreplaceability if stolen, altered, or otherwise compromised. And, like tokens, Biometric solutions require the User to use a hardware device that is configured with the right sensor(s) at the time of authentication.

Therefore, a need exists for a system and method to increase password security while resolving the conflict between data security and ease of use. The innovation described herein is a system and method for the repeated, dynamic, and automated construction, transformation and manipulation of strings of printable or typeable characters that are commonly used for passwords, PINs, keys, tokens, encryption, and filenames, which may be defined as a class of printable strings. The system and method described makes use of secured password "hopping" to maximize data security and a user's ease of implementation.

In an embodiment, passwords are representative of a variety of printable character strings used to identify information, including server port numbers, file names, folder names, credit card CVV codes, bank debit card PINs, Keys, Nonces, random number seeds, and other character strings associated with information security. Any of these identifying strings can be the object of the hopping invention described as "password hopping". The term "password" is therefore representative of any identifying string used for labeling or protecting access to other information. The precise methodology of application may vary from that described herein for passwords, but the claims and novelty of the invention remains unchanged by its application to other identifying strings.

In an embodiment, an innovative system as herein described solves the password problem that has plagued information security for decades. In such a solution, entitled Active Password Management (APM), the APM incorporates a Password Hopping System (PHS) that is a central element that enables Users to actively manage their passwords and balance password security strength with simplicity. As several security experts have publicly commented, a solution must be strong and simple if it is to be effective. The PHS constructs passwords from secret user-specified algorithms and easily available time-variable information sources that are automatically replaced (hopped) at secret time intervals. The construction of all hopped passwords begins with time-variable information "hidden in plain sight," within an easily available information source. The resulting hopped passwords achieve a User-controlled level of information security by balancing password entropy (complexity and length) with password disposability (lifetime). In this embodiment, APM actively involves both people and businesses in their security. Control, and the balance of strong security and simplicity for the User, occurs at an individual level. APM allows a User to define an activity level for password hopping and consequently align User configuration parameters of the Algorithm Server to default values that ensure security is optimized. In a non-limiting example, a less active APM level might configure the Algorithm Server for monthly password hops with a sophisticated set of data enhancement and transformation "rules" that comprise a "Formula" specified by the User (constructing a longer password). Whereas a more active APM level might default to a daily hopping Schedule with simpler Formula to construct a simpler password. Simpler, easy-to-remember passwords can achieve a high security level when their useful lifetime is automatically short.

The primary benefit of password hopping for individuals, which includes consumers or employees, is simple and secure disposable passwords with finite lives that improve the security of Users' information without adding complexity or inducing security fatigue. Short automated hopping schedules and easily available dynamic information mitigate password weaknesses such as reuse and provide users improved self-protection if a business is negligent, has poor security controls, or the User's password is stolen or otherwise compromised, regardless of whether or not any of these activities are detected.

In an exemplary embodiment, where a business relies on the PHS as their sole authenticator and the PHS provides "authentication as a service" for all user (customer and employee) access to accounts and services, information security is strengthened. Because the Algorithm Server only stores password construction rules and passwords are constructed at the moment of use, there are no stored passwords. In a non-limiting example, a business uses the PHS for all of its users and all passwords used in authentication are hopped passwords. Uniquely, the business no longer stores passwords and no passwords exist to be targeted, stolen, or misused. In this embodiment, the Algorithm Server may be configured so that user passwords for employer accounts (work passwords) are isolated from their passwords used for personal accounts. In a non-limiting example, the User may specify employer-specific dynamic information sources for their work accounts, and different dynamic information sources for their personal accounts, and apply the same Formula for the construction of passwords for work accounts that will never be the same as those for their personal accounts. The PHS uniquely and automatically mitigates a common information security vulnerability of password reuse between work and personal accounts.

In an embodiment, a user may choose to authenticate their identity with a business online via the business's website that may include an "Authentication Server," and which may be supplemented with a "Password as a Service" server, which is referred to herein as an "Algorithm Server". The Algorithm Server helps a user to secure their online identity by creating and replacing, or "hopping," random passwords at appropriate, pre-configured or specified time intervals to limit the life of any given password. The Algorithm Server stores and applies Formula rules to dynamic information to construct unique, dynamic passwords that may be easily and simultaneously known to the user without communication of any of the passwords. By limiting a password's life, a user may limit the time within which it can be misused or exploited. Frequent hopping enhances security without adding to password complexity. The Formula is fed user-selected time-variable information, such as, in non-limiting examples, websites, newsfeeds, or data services that may be easily observable through being open source. In an embodiment, user-selected dynamic information may also include limited access sources such as email newsletters or private subscription content. Additionally, the dynamic information sources may be those that change frequently. In non-limiting examples, appropriately dynamic and unpredictable information used for a Formula may include news story headlines, weather data, or any other content that is readily available through public or limited access sources but changes on a frequent basis.

Enhancement and transformation rules are applied to the dynamic information to construct unique dynamic passwords that can be easily and simultaneously known by both the User and Authenticator without communication of the password between them. Uniquely, the underlying dynamic information used in password hopping is hidden in plain sight, with Formula rules and dynamic data sources known only to the Algorithm Server and the User.

Not only can a vast number of dynamic information sources be used for Formula source information, more obscure dynamic data sources such as a corporate newsletters or industry publications can be used to further heighten security. Even the rules themselves can be hopped to increase security measures. With password hopping the most effective security measure is the hopping frequency, which is defined as the scheduled number of hops and the scheduled time intervals for initiating each password hop. Secure password hopping occurs as a background process without a need to communicate the one or more newly constructed passwords resulting from the hopping activity to the user. The method of hopping passwords with time-variable information hidden in plain sight is a departure from existing conventional password security approaches.

In an exemplary embodiment, a user may log into an Algorithm Server and specify a particular set of conditions to create Formula rules. The conditions specified by a user may include, but are not limited to, the source of dynamic data, the coordinate position within the dynamic data source of time-variable data to be used, the desired interval at which the hopping algorithm is triggered, and third-party web sites where the resulting hopped password is to be used.

The user may prefer to manually collect the time-variable data and apply Formula rules to determine a current Password. The user may then log into his account at any third-party Authentication Server and update the existing Password with the newly created Password. The user may then log out of any third-party Authentication Servers and use his new password to login at a later time. Unfortunately, manually hopping passwords is equivalent to current static passwords that change only as frequently as the user changes their password and provides no real security benefit to the user.

In an exemplary embodiment, an automated service is preferred to actively manage the password hopping activity for users. To perform this process, the user would establish an account with the PHS "password as a service" server, the Algorithm Server, and define Formula rules through which the hopping activity would be performed, as well as identify the dynamic information sources of choice for the user. In a non-limiting example, the user also specifies a desired hopping schedule (date and/or time interval) of a specific time-period and provides the website address(es), in the form of one or more URLs or domain names, of user private content where the passwords are needed to authenticate and gain access.

In this embodiment, the "pairing" of Formulas and hopping Schedules to a plurality of User's accounts at a plurality of TPV web sites ensures that authentication to the right TPV web site account occurs. Pairing requires the verification of a User's TPV account credentials upon first use of the password hopping service with the TPV Authentication Server. Once the pairing is complete, authentic user passwords provide access to their TPV account and private content.

At the expiration of the time interval, the Algorithm Server collects new dynamic information from a specified information source and stores it for use in password construction at any time during the current hopping interval. When the user connects to TPV Authentication Server to login, the Authentication Server calls the Algorithm Server via an application programming interface (API) utilizing a unique private key. The Algorithm Server verifies the key and presents to the user (via the TPV web server) a login page to collect the username and current hopped password. Both credentials submitted by the user are only received by the Algorithm Server and the submitted password is compared with the authentic password that is instantaneously constructed (using the Formula rules and stored dynamic information) by the Algorithm Server. If the passwords match, then the Algorithm Server authenticates the user to the Authentication Server (via the API) and the user is granted access to their private content within the TPV web site.

This process continues without any further intervention from the user and dynamic information is collected and stored many times during a user's online absence from a particular TPV web site and Authentication Server depending upon the chosen hopping Schedule.

In this embodiment, when the user next visits a TPV site and authentication is required, the user may easily compose the correct password by knowing the Formula rules that the user previously specified and visiting the easily available information source to identify the time-variable data at the coordinate position previously specified. The result is a user authentication with a strong dynamic password that may be frequently replaced. And because of the potentially short lifespan of the dynamic password, sensitive user data is far more invulnerable to exploit if the password is stolen or exposed. The exposure to the loss or theft of the password is also limited by the secrecy of the user-specified time interval for the hopping activity.

In a non-limiting example, a password subject to a hopping schedule specifying an interval of twenty-four hours would be replaced with a unique random password six times in a week. A password subject to hopping on a twelve-hour interval could lead to thirteen passwords in the same week-long time period.

In an alternative embodiment, the hopping activity may serve as the second factor in a Two-Factor Authentication (2FA) process. A User Formula rule may specify a secret non-variable character string (any fixed character string) as one part of a hopped password. A second Formula rule may specify the time-variable part of a hopped password. In this non-limiting embodiment, Factor 1 "something you know," is the user-specified non-variable character string, and Factor 2 "something you get or have" is the time-variable data (or its transformed version). The combination of both password parts (factor 1 and factor 2, in any order) is compliant with 2FA security criteria. Both factors are present in a single password without the need for additional devices or the vulnerability of code communication at the time of authentication. As a result, the user login experience is not disrupted and this invention may represent a commercially valuable chokepoint for future authentication security.

In an embodiment, the PHS is a system for improving the security and simplicity of passwords using repeated, frequent, timed construction of disposable passwords by remote, automated means without required communication of any password between any involved party. A plurality of user-specified Sources, Formulas, and Schedules (together a hopping algorithm) may be specified by users to construct personalized passwords that are more convenient to use and easier to memorize. In this embodiment, security strength is achieved from a balance of password complexity, through length and entropy, and password life such as that provided by the hopping schedule, rather than the password alone. The security strength is user controlled through a combination of dynamic information source, the coordinate position of time-variable data, Formula rules, and hopping schedule. Simpler and shorter passwords constructed from random information and hopped more frequently can achieve the same security strength as longer and more complex passwords that are hopped less frequently.

In an exemplary embodiment, a User joining a "password as a service" provider may construct a master password Formula to access their configuration data within the PHS, such as specified dynamic information source, Formula rules, and others. The master password Formula may be expressed in one or more password construction rules. The User's master password resulting from their master password Formula may provide access to the User's PHS configuration settings via the PHS web server. In a non-limiting example, the User's master password Formula is distinct and unique from those Formulas used for their TPV Site authentication. In this example, the User's master password Formula defines a dynamic information source that is unique to the master password Formula (i.e., different from any used for their TPV site Formulas.) And the master password Formula may include different Formula rules or rule sequences to further separate the constructed master password from any that might be constructed with a TPV Site Formula. Additionally, the user's master password Formula may include a unique hopping schedule different from any used for TPV Site Formulas. The multiple dimensions (information Source, Formula, and Schedule) of uniqueness of the master password Formula strengthen the security of the master password.

In an embodiment, the PHS provides for automated construction of customized passwords according to a hopping algorithm created by a User and known only to the User and the Algorithm Server. This automated construction repeatedly customizes user passwords according to a Formula by combining and altering the dynamic information by means of Formula rules. A Formula rule constructs or transforms a part of a password. In a non-limiting example, multiple Formula rules specify multiple parts of a hopped password or specify the order in which the parts are assembled into a single password. Formula rules may identify one or more time-variable data character strings from one or more information sources. Formula rules may also include one or more specific non-variable, or fixed, character strings added to the Formula to increase password entropy. Formula rules may also define the substitution, transformation, addition, subtraction, concatenation of the time-variable data or apply other similar methods to the time-variable data, such as, in a non-limiting example, reversing the spelling order. In an additional non-limiting example, another Formula rule might specify the prepending or appending fixed, personalized, character strings to the dynamic character strings, whether the dynamic character strings are altered or unaltered, that may be obtained from dynamic information sources. In a non-limiting example, another Formula rule may construct an easily remembered "site tag" in the password character string to indicate the TPV site at which the password is used and to construct unique passwords for each site using a single Formula, and thus avoiding the brushfire vulnerability present with many passwords.

In an embodiment, a Formula rule may include specifying the order in which Formula rules are applied in password construction resulting in greater variability of passwords from a single set of Formula rules. And yet another Formula rule may further specify the order of the various password parts constructed from other Formula rules of the password, such as those parts constructed from the non-limiting rules previously described. For example, the altered or unaltered dynamic string parts and any fixed string parts, such as a user secret word, or site tag, may be arranged in a variety of serial orders.

In an exemplary embodiment, automated collection and storage of dynamic source information by the Algorithm Server may proceed according to a schedule, such as storing a copy of dynamic source information at a specific time, such as a news headline captured on a timed interval. In this embodiment, the automated retrieval and storage of dynamic source information may be obtained at scheduled times specified by a User defined hopping Schedule. In an embodiment, the automated retrieval and storage of dynamic source information by the Algorithm Server may also be scheduled by the source of dynamic information, such as when news headlines are updated or refreshed or an email newsletter is sent and received in an inbox, rather than user-specified. In non-limiting example, the automated retrieval and storage of dynamic source information by the Algorithm Server may also occur at the moment that a User logs in at a TPV web site. In a non-limiting example, this automated retrieval and storage may occur at the moment of authentication request. This is a non-limiting example of an "on-demand" hopping schedule determined by real-time user activity. In yet another non-limiting example, the automated storage of dynamic information may occur at times scheduled by the PHS, such as when it generates time-variable information such as an email newsletter, composed by the PHS, and sent to a user email inbox. This PHS-generated information may be created at times scheduled by the User defined hopping Schedule.

In an exemplary embodiment, the User may obtain new or recent dynamic information from the specified information source and apply their Formula to construct their new password independently from the Algorithm Server. The Algorithm Server, operating automatically and independently, obtains the same dynamic information and performs the same password construction activities. The Algorithm Server and the User do not require intercommunication of a change in the password. No synchronization between the two is necessary. Both know the change based on the pre-configured Formula and hopping Schedule. In a non-limiting example, the PHS may provide timely electronic notification of dynamic information to the User at their request. Source information is hidden in plain sight in the notifications, as it would be in its original form. In an embodiment, notification methods include email or text messaging to mobile devices and provide users with a redundant means of locating the time-variable data used by their Formula.

In an exemplary embodiment, the PHS includes an API to simply, quickly, and securely authenticate users to their TPV account via the TPV web site login page. In this embodiment, the PHS, through its API, performs the role of a supplemental authentication service and controls specific Authentication Server-to-Algorithm Server communications during a user login session at the TPV web site. The API provides a secure interface to PHS servers for several user-initiated functions while they are at the TPV web site. In this embodiment, TPV Customers may register with the PHS "password as a service", create a User Formula and pair their TPV account, and login to their TPV customer account with the PHS. In this embodiment, the user may also add a TPV site to a User's PHS service account and pair the user's TPV site and TPV account with a User Formula, and they may upgrade their PHS service during the Add Site process if their current service lacks the capacity for additional TPV sites. In this embodiment, any account-Formula pairing occurs only once on initial authentication access and should include automatic forced password reset the next time the User logs in directly through the TPV Authentication Server. Because the User's old TPV account password remains stored in the TPV Authentication Server, it should not be used for authentication. Marking the account for password reset prevents a security vulnerability caused by leaving an old unused password in the Authentication Server.

In an embodiment, the PHS API conducts secure server-to-server data transactions between TPV servers and PHS servers acting mutually on behalf of all TPV Customers and the PHS service rather than operating as a supplemental authentication service to the TPV. In this embodiment, the PHS operates as a stand-alone, dedicated, "authentication as a service" solution for businesses, and the PHS becomes as a replacement for the TPV Authentication Server. In this embodiment, the PHS completely eliminates all stored passwords while preserving other TPV customer account records within TPV servers, which significantly improves the access control and security for the TPV. This lowers the risk of exploitation for TPV customer records since no customer passwords exist to be hacked or stolen. In this embodiment, the PHS mitigates exposure to multiple security vulnerabilities, including: any poor TPV security practices that may exist, human error, negligence, accident, or intentional harm. As a stand-alone authentication service, the PHS bears the responsibility for complex security administration, configuration, patching, upgrades, and monitoring, and improves security for many TPVs because PHS operators and maintainers are professionals trained and equipped in information security.

In an embodiment, the PHS, via its API, operates as an "information security as a service" provider. In this embodiment, the Algorithm Server constructs unique work and personal passwords for TPV employees to prevent a TPV common security weakness. In a non-limiting example of this embodiment, the User may specify the same Formula but use a distinct dynamic information source to construct work passwords and a different dynamic information source to construct their personal passwords. Information sources for work accounts may include corporate email newsletters or other limited access sources that can be segregated for work purposes. In this embodiment, the PHS, via its API, may provide privileged access management to employees authorized for access to privileged areas of a closed network, where the closed network may consist of a business network. In a non-limiting example, the User may configure a single hopping algorithm such that Formula rules are applied serially and construct several passwords that are increasingly sophisticated for authentication with each elevation in the employee's network access privileges. In this embodiment, a non-limiting example is a Formula rule using time-variable data in the password that authenticates initial employee access to a business network, but elevated access to a restricted area of the network that requires use of a second Formula rule to add additional time-variable data to the password construction. The password containing both time-variable password parts authenticate the employee to a more restricted access area of the network.

Encryption of private data at rest is a common security standard. In most networks accessible to external users, the private data is contained in a database server and encryption may be applied in a variety of ways, such as the full database, database tables, database columns, or database rows. Typically, any encryption requires a key. initialization vectors and cryptographic ciphers to convert plain text information to cipher text. In an embodiment, the Algorithm Server may provide the time-variable parts of a User's hopped password to the PHS for transformation into a "seed" for creation of a symmetric encryption key. This transformation may use one of several available cryptographically secure pseudo-random number generators for encrypting their private data. Private data is that data either held by the PHS servers or by the TPV servers. In this embodiment, the PHS uniquely produces personalized encryption of user private data. Personalized encryption increases user privacy and information security because their protection is not reliant on system-level security policies or practices or a central master key, which if stolen or misused compromises the entire database in a variety of well-known ways. Rather the User privacy and information security are built on choices the User makes. In this embodiment, the PHS may combine the User seed with additional randomly generated characters, such as, in a non-limiting example, a PHS seed, to increase the entropy of the seed for the cryptographic key. In an embodiment, the Algorithm Server encrypts the combined User and PHS seeds and transmits them to the TPV Authentication Server via the PHS API. The TPV may then add additional characters, consisting of the TPV seed, to the received data to arrive at a final seed that generates the encryption key to encrypt/decrypt user private data. For decryption, the key is based on seeds used in the prior login session because those were the seeds used for the encryption of the user private data. For encryption, the key is based on seeds used in the current login session. In this embodiment, the user private data can only be de-ciphered by a TPV during an online session where the User has been authenticated via the PHS—seeds for the key from the TPV, PHS, and the user are needed to reconstruct the key. This reduces the exposure of User private data in time and its access by others. The data is not accessible to TPV employees or their systems unless the User is logged through the PHS. The only time the TPV's API call to the PHS is recognized and acted upon is at the moment of User authentication to the TPV. And because the API must start with a User login, the PHS is unable to initiate the API activity independently. In this embodiment, the User conducts business with the TPV via the TPV servers, and when the session closes either by User logout or time-out, the User data within the TPV is encrypted and stored with a new secure cryptographic key. In this embodiment, all API communications are conducted and secured using Transport Layer Security (TLS) protocols. All generated key components are destroyed by both the TPV, which occurs at end of session, and the PHS, which occurs at end of authentication.

In an exemplary embodiment, the PHS includes an administrative service whereby the system configuration may be securely accessed and configured. Administrative services include configuration of server performance variables, performance monitoring, troubleshooting technical problems, data backup, system security, and user support.

NON-LIMITING EXAMPLES

In a non-limiting example, the PHS may permit port hopping. Within the firewalls of private networks, servers utilize port assignments to identify where communications for various applications should occur. In one instantiation, a web server may communicate with a database server over a default application port, such as port 3306. But communications may occur over any of a large number of alternative selected ports that may be assigned for communication. Unauthorized intruders may be granted access through a firewall and then have the freedom to operate broadly on the other side. Applying the PHS invention, time-variable dynamic data may be converted to a port number and used to hop ports for server-to-server interactions. When hopping is frequent, the communications port of a destination server with valuable information is difficult to locate and traffic analysis is also greatly impeded.

In an alternative non-limiting example, the PHS may permit Filename Hopping. With an application such as a database server, there is much valuable information that unauthorized intruders would attempt to exfiltrate from a private network. These files can be identified by meta-data such a filename, date, size. In a file name hopping instantiation, there are many duplicates of the primary file. All duplicates are filled with scrambled information but have identical metadata except for the file name. The PHS invention hops file names and knows which file is the original or authentic file containing valuable data. The probability that an intruder can select the correct file on the first attempt is the inverse ratio of the number of files duplicated.

In an alternative non-limiting example, the PHS may permit Credit Card CVV Hopping and/or Debit Card PIN Hopping. The PHS innovation may be applied to credit or debit card CVV codes or PINs, replacing the static codes with a dynamic number sequence that is converted from the User's time-variable password part(s) or using a number string, such as, in a non-limiting example, the market price of a stock index, as the time-variable source information.

In an alternative embodiment, the PHS may provide password hopping for Internet-of-Things (IoT) devices. Most all IoT devices include firmware that controls their configuration and operating parameters. Access to the firmware is secured with a static password. In this embodiment, the PHS, triggered by the elapsed time interval, may initiate a password hop within the IoT device by constructing a new hopped password. In a non-limiting example, the PHS may access and authenticate itself to the network hosting the IoT device. The authentication may or may not be by means of password hopping, and the authentication may or may not occur using a robotic script to submit authentication data to the network authentication server in substitution for a User. Once network access is granted, the PHS locates the IoT device with pre-configured location data, logs in to the IoT device with the prior password, which may be an expired hopped password constructed from the Formula, changes the IoT device password to the current hopped password, and then logs out of the IoT device and network. In a non-limiting example, this embodiment may be used by a homeowner to secure their IoT devices connected to the Internet through their home local area network.

In an alternative embodiment, the PHS may provide a time-variant initial seed for Cryptographic methods. Cryptographic algorithms generally use a random number generator as a key for the encryption. But all random number generators require a "seed" value on which to apply the generator. The PHS invention may be used to create the initial seed value used for random number generation.

The new demands upon cloud-based computing machines require operation at large scale, with the ability to rapidly scale from a few machines to thousands of machines, as the associated machines adjust to peaks and troughs of operational demand, and to operate with low latency across the globe.

In a cloud computing environment, the purpose of authentication is to establish trust as machines connect with each other automatically; critical business operations are moving from on-premises data centers to the cloud where the traditional security perimeter and defense tools are ineffective. Consequently, there is a need for a "Zero Trust" approach to assure cloud operations are authorized and secure by authenticating machine identities.

Zero Trust principles are difficult to implement when there are thousands of containers, or machines that are rapidly initiated to meet peak demand periods and/or short-term demand from application users. Confirming machine identities and authenticating their secret credential for every pair of machine interaction, or sessions, is very challenging at cloud scales. There are several shortcomings with existing solutions to achieve Zero Trust:

Secrets rotation in the cloud is limited to individual cloud vendors (for instance, by way of non-limiting example, Amazon Web Services Secrets Manager). This is due to the need to inject each rotated secret into the app or service where authentication occurs. Each cloud vendor must assign access privileges to identities and permissions for those identities to programmatically change the 'key' at the app or service endpoint that performs authentication. This fact creates standing privileges for certain identities, a situation that inherently fails a Zero Trust principle. There is no feasible Zero Trust method for cross-cloud rotation of machine secrets;

The existing methods of secrets rotation for machines are rudimentary. Secrets are "leased" at creation to force their expiration, and rotation requires injection of a replacement secret at the machine endpoints where authentication typically occurs. Rotation must be triggered by an administrator or programmatically when they expire. There is no existing real-time method for secrets rotation without injection at machine endpoints; secrets are rotated only when machines are in a maintenance mode. No capability for real-time operational synchronization of symmetric secrets across clouds exists;

Machine secrets are often stored in centralized "secrets stores" (vaults) for protection, but this creates another set of credentials (the keys to the vault) which must then be protected. This creates a chain of secrets stores that eventually leads back to a human administrator with a password (known as Secret Zero) that protects the root access to all other security measures. Even multi-factor authentication methods have been insufficient to protect exploitation of human password access. No existing solutions address the vulnerabilities of the Secret Zero problem;

Machine identities are based on asymmetric key material (public and private cryptographic material). Identity "certificates" are issued by many possible vendor "authorities", and while each may build a chain of trust for their machines, the many vendors are difficult to certify and create multiple private keys which must be protected. As these certificates expire, they are replaced with new certificates (containing and composed of new cryptographic material) that disconnects the new identity from any prior identity history (each new pair of public and private keys are unique and not dependent on prior cryptographic material); and Protection of data in transit is possible using public key cryptography (asymmetric encryption) where two keys are needed (a public key and a private key) to encrypt the data. This data protection is enabled in Transport Layer Security by the machine identity cryptographic material represented in 'certificates.', but this approach does not protect data after it arrives at an HTTPS endpoint and may travel within data centers or stored in plaintext. Endpoint encryption protects data in transit and at rest and is usually best achieved with symmetric encryption. The longstanding security vulnerability with symmetric encryption is in sharing the encryption key with a destination endpoint without exposing it to theft or disclosure. There is no straightforward approach to obtain a symmetric key at two endpoints without one endpoint sharing it with another.

Existing solutions are complicated and require manual configuration buy DevOps personnel for proper operation. They impede the automation process required for DevOps pipelines.

In an embodiment, the method and function of the PHS that authenticates a human user to business systems may be applied to two or more machine or workload entities that need to establish trust before performing a computing process. The instant innovation uses the method of creating a dynamic password (the Formula for human use) as an algorithm for machines to independently build an ephemeral symmetric secret and establish their identity to authenticate to an Algorithm Server and establish trust. Then, by virtue of that trusted authentication, the trust may be extended to permit both workload entities to trust each other for a period of time sufficient to complete a business process.

In an embodiment, the instant innovation uses several critical management functions, including the management and rotation of machine identities, the management and rotation of machine "secrets," the brokering and management of sessions between machines in various public and private clouds, and the encryption of inter-machine communications.

In an embodiment, the instant invention follows the Kerberos 3-party design pattern. The SAMI Platform operates as a trusted third party between two or more workloads to broker and manage security, identity, connections, sessions, and secrets in a Zero Trust cloud environment. This is similar to the PHS operating as a trusted party between a business and its customers.

In an embodiment, the instant innovation uses the CHIPS™ protocol as a steganographic approach to provide two endpoints with an identical secret without sharing that secret with either endpoint. For machines operating in a cloud environment, both machines share an algorithm that defines a publicly available location of dynamic digital information and the location of dynamic content at that location. Both machines possess the same algorithm and may independently visit the public location at nearly the same time and retrieve the same dynamic elements and may modify and assemble them in the same way (per the algorithm) to create an ephemeral symmetric secret at each endpoint.

The secure storage of keys in a digital environment creates a new key that must be secured itself, but securing this key starts a chain event in which that security method requires authentication of an identity and a proof (such as a password or another key.) Ultimately this chain ends at a root identity of a person or machine that owns the root 'key' or password. This root key or password is referred to as Secret Zero. In an embodiment of the instant innovation, the Secret Zero is an algorithm instead of a string of printable characters that would be submitted by the root identity. The instant invention replaces the root secret, which are strings of printable characters, with an algorithm that generates a secret when needed. The algorithm contains one or more public parts (the public locations) and one or more secret parts (the location coordinates of the dynamic elements within the public location). The algorithm relies on the Codes Hidden In Plain Sight (CHIPS) steganographic protocol (i.e. the PHS Method and the Formula). The formula used by humans in the PHS to create a password is replaced with a sophisticated algorithm (the CHIPS™ algorithm) that can easily and quickly be processed by a computing device.

In an embodiment, the CHIPS™ algorithm is inert until the time of processing and needs a computer to produce an ephemeral symmetric secret, unlike typical secrets that can be scanned and identified in code by their characteristics and randomness of the character strings. CHIPS™ algorithms are impervious to detection by scanning. The CHIPS™ algorithm includes an additional part that was not present in the PHS human formula. The new part requires the input of time-variable information that is dependent on a machine alias ID that cannot be known before a session is started by a machine; the time-variable information is a derivative of the prior session history (as tracked on a ledger) for the machine. If an unauthorized entity were to obtain the CHIPS™ algorithm it could not be successfully used because it is missing a key part—the machine part—that can only be obtained at the time a session starts. This ensures that ephemeral symmetric secrets can only be created by the legitimate authorized identity triggering the processing of the CHIPS™ algorithm.

In an embodiment, the CHIPS™ algorithms have improved security because they do not travel across the cloud. They always remain within the entity for which they have been created and are protected as compiled code in a Container image file, such as, by way of non-limiting example, a Docker image file. The CHIPS™ algorithms also reside within the SAMI Algorithm Server and are never exposed or transmitted.

In an embodiment, the Secrets Manager stores ID pairs rather than the algorithms. It stores a matched pair of Machine Alias ID and its Algorithm ID. All Algorithms are encoded using software code in the Algorithm Server, and the Secrets Manager tells the Algorithm Server which Algorithm to run to create the ephemeral symmetric secret for a specific machine when it is needed.

In an embodiment, the CHIPS™ algorithm is tamper resistant. Because the CHIPS™ algorithm is established once at registration and stored in two locations (by way of non-limiting example, in the SAMI Algorithm Server and the Sidecar) an attacker must change the algorithm in both locations at the same time to avoid detection. The change of the algorithm at just one location creates different ephemeral symmetric secrets and authentication fails. Failed authentication is evidence of possible algorithm tampering and causes a security alert to operators.

In an embodiment, the instant innovation uses Self-Rotating Ephemeral Symmetric Secrets. Rotation of secrets is usually performed by commercial Secrets Managers with static secrets given a "lease" period and a "time to live" value when they are created or invoked from a secrets store. These are essentially manually configured to programmatically expire and must then be replaced (sometimes programmatically). The instant innovation's use of the CHIPS™ algorithm (i.e., the Algorithm Server) and the CHIPS™ protocol ensure that the symmetric secrets generated are naturally ephemeral and self-rotate at an unpredictable cycling of the dynamic elements and public locations used by the CHIPS™ algorithm. Ephemeral symmetric secrets rotate naturally and require no additional configuration after the CHIPS™ algorithm is created.

In an embodiment, the instant innovation uses Standardized Sidecar Security. The use of executable code that is common among Sidecars and can be placed within cloud applications and services improves security because it lessens the need for custom configuration by human developers and the standardization reduces configuration errors that lead to security vulnerabilities. All necessary security features are designed-in, built-in, and code-signed to ensure the Sidecar is tamper-proof. Sidecar interfaces are only allowed with its specific workload identity, other SAMI Sidecars and the SAMI Session Manager.

In an embodiment, the instant innovation uses Centralized Session Brokering and Management. Zero Trust principles include a "deny all" security posture that forces authentication of identities and authorizations at every interaction. The Session Manager of the instant innovation uses the ephemeral symmetric secret provided by each workload Sidecar at the start of each session to authenticate workload identities. It also uses the Authorization Server and the resource Sidecar to broker session permissions and parameters consistent with authorized and historical trust levels, and it sets the session lifetime and issues the session token to each Sidecar for secure inter-workload operation.

In an embodiment, the instant innovation uses Self-synchronizing ephemeral symmetric secrets. Because it is very difficult to securely provide the same symmetric secret to two cloud endpoints at the same time and during operations, the timing necessary for synchronizing rotating secrets in cloud computing must be very accurate. The instant innovation's CHIPS™ protocol and Session Manager brokering ensures that workload ephemeral symmetric secrets self-synchronize with the Algorithm Server's version of the ephemeral symmetric secrets at the start of each session. The Session Manager also simultaneously issues the ephemeral session token to both Sidecars (with lifetime data in the encrypted token message) to ensure token synchronization between inter-operating workloads throughout the session.

In an embodiment, the instant innovation uses Resource-Governed Access Control. Resource servers govern access permissions and policies with a Client machine on a 'per session' basis based upon the Client machine identity and history with the resource. A ledger of sessions for each machine provides a history of successful transactions, and provides a basis for the trust the resource may bestow on the client. The resource owner (business) may use current threat conditions to elevate security policies per machine identity and their experience with any particular identity. Resource owner policies govern session permissions and privileges with client machines; on-demand Zero Trust after initial machine registration is the default operational condition.

In an embodiment, the instant innovation uses Nested identities. Identities are nested as parent-child in a hierarchical structure. Identities extend the trust from the parent identity to a child identity at registration only. The one-to-many relationship (a business may have many services or apps) creates identity families, or segments, and Zero Trust can be configured to begin at any hierarchical level. At the lowest level, Zero Trust requires workload identities to authenticate to each other for any session to begin.

In an embodiment, the instant innovation uses an Identity Trust Chain. The use of machine aliases built from a hash of a series of workload sessions (ledger entries) with another machine creates a history that is immutable and trustworthy. As each new session occurs the session ID is entered in a session ledger for a machine. At the same time, the session ID is added to the hash of the session ledger (without the current session) and then re-hashed. This creates an identity chain, or blockchain, and the hash is used as a machine alias ID that uniquely identifies the machine entity.

In an embodiment, the instant innovation uses a Self-rotating Identity Alias. The machine identity alias ID rotates automatically with each new workload session. This makes the identity credential dynamic and improves security because both the identity and the secret that are used for authentication are ephemeral. The identity alias ID does not need to be kept secret.

In an embodiment, the instant innovation uses Identity Proofing. The metadata (such as, by way of non-limiting example, the transaction pattern from a single session) for a series of machine sessions creates an identity characteristic that reinforces the initial identity. Pattern analysis reveals anomalous session transaction patterns that may occur from unauthorized use. Pattern mismatches produce security alerts to operators.

In an embodiment, the instant innovation is Cloud Agnostic. The use of rotating secrets for machine authentication is an existing practice, but it is limited to the vendor cloud (by way of non-limiting example, AWS, Microsoft Azure) in which the application or services exist because each new secret must be injected at the machine endpoint by an identity with privileges to do so. AWS Secrets Manager can rotate secrets for its services and Azure can rotate secrets for its services, but they cannot rotate secrets in each other's cloud. The SAMI Platform design is not constrained to a single cloud. It can rotate secrets for services in any cloud because the secrets are generated at the endpoint machine and authenticated at the Session Manager rather than injected into the machine and authenticated there.

In an embodiment, the instant innovation uses Symmetric Endpoint Encryption. All messages are symmetrically encrypted at workload endpoints (via Sidecars), and at the SAMI Session Manager using either the ephemeral symmetric secret or session token specific to messages and endpoints. Message contents remain secret in transit and at rest, and reliance on public key infrastructure such as, by way of non-limiting example, Transport Layer Security, for encryption in transit is unnecessary, thereby reducing the amount of cryptographic key material that must be managed.

In an embodiment, the instant innovation uses Just-in-Time authorization. The method of identity management and session brokering whereby a resource workload governs permissions to a client workload enables two workloads to automatically establish "on-demand Zero Trust" connection with one another at operational scales and timing of cloud computing. Trust (registration), established with the SAMI Platform at registration, is all that is needed for two workloads to interoperate in with Zero Trust principles.

In an embodiment, the instant innovation uses Interlocked Authentication Credentials of identity and secret. The rotation (hopping) of the identity credential (machine alias ID) is interlocked with the hopping of the secret (ephemeral symmetric secret). A session cannot occur without having the hopped machine alias ID to produce the ephemeral symmetric secret, and the hopped machine alias ID can only be built when a Session ID is produced after the authentication of workload ephemeral symmetric secrets. The interdependence in the creation of the machine alias ID and ephemeral symmetric secret ensures that neither the identity nor the secret authentication credential can be produced without the other and neither can be known or predicted beforehand.

In an embodiment, the instant innovation's Streamlined DevOps process of Sidecar integration saves time and reduces security errors. The architecture of the SAMI service uses pre-configured Sidecars as a "plug and play" code package that is easily installed by DevOps persons in place of the current practice of installing an API key, for example. This minimizes DevOps workload, avoids configuration errors, and improves security.

In an embodiment, the instant innovation is a system for active password management including a data processor, where said system further includes an algorithm server in concert with said data processor. Said algorithm server accepts as input at least a data source, construction formula, and time schedule and utilizes said input data source, construction formula, and time schedule to construct a password hopping capability. Said algorithm server may accept a request for system access utilizing an input password, at which time said algorithm server may process said input password through said password hopping capability to dynamically create and manage at least one hopped password created from said input password. One or more system user may utilize said at least one hopped password for secure access to a system resource.

In an embodiment, said input data source may include a user-specified dynamic data resource. Said user-specified dynamic data resource may include a public data source, a private data source, or a combination of public and private data sources.

In an embodiment, the system's said construction formula may include data enhancement and transformation rules specified by the user. The construction formula may further include rules to include one or more specific non-variable or fixed character strings added to the construction formula. In addition, the construction formula may further include modifying the position of said non-variable or fixed character strings and one or more dynamic strings to increase security of the resulting string created by said construction formula.

In an embodiment, the system time schedule is varied on a user-specified hopping frequency providing the scheduled number of hops and the scheduled time intervals for initiating each password hop.

In an embodiment, the system of the instant innovation further includes dynamically managing the password hopping schedule and password hopping construction to manage the security level specified by a user.

In an embodiment, the instant innovation is a method for active password management, including accepting as input a data source, construction formula, and time schedule; utilizing said input data source, construction formula, and time schedule to construct a password hopping capability; accepting a request for system access utilizing an input password; and processing said input password through said password hopping capability to dynamically create and manage at least one hopped password created from said input password, whereby a user utilizes said at least one hopped password for secure access to a system resource.

In an embodiment, said input data source of the instant method includes a user-specified dynamic data resource. Said user-specified dynamic data resource includes a public data source, a private data source, or a combination of public and private data sources.

In an embodiment, said construction formula of the instant method includes data enhancement and transformation rules specified by the user. Said construction formula may further include rules to include one or more specific non-variable or fixed character strings added to the construction formula. In addition, said construction formula may further include modifying the position of said non-variable or fixed character strings and one or more dynamic strings to increase security of the resulting string created by said construction formula.

In an embodiment, the time schedule of the instant method is varied on a user-specified hopping frequency providing the scheduled number of hops and the scheduled time intervals for initiating each password hop.

In an embodiment, the method of the instant innovation may further include dynamically managing the password hopping schedule and password hopping construction to manage the security level specified by a user.

Turning now to FIG. 1A, at 100, the Algorithm Server determines if the specified time interval has elapsed. If the specified time interval has not elapsed, the hopping algorithm is not activated and the source information used for a "hopped" password is not changed to a value different than the value previously known to the User. The process then terminates without "hopping" or modifying the stored time-variable data essential to password construction.

In an embodiment, if the time interval (i) has elapsed, at 102 the Algorithm Server collects and stores the time-variable data (vD) from the specified source. The vD is located at the specified coordinate position of the dynamic data source.

Figure 1B:
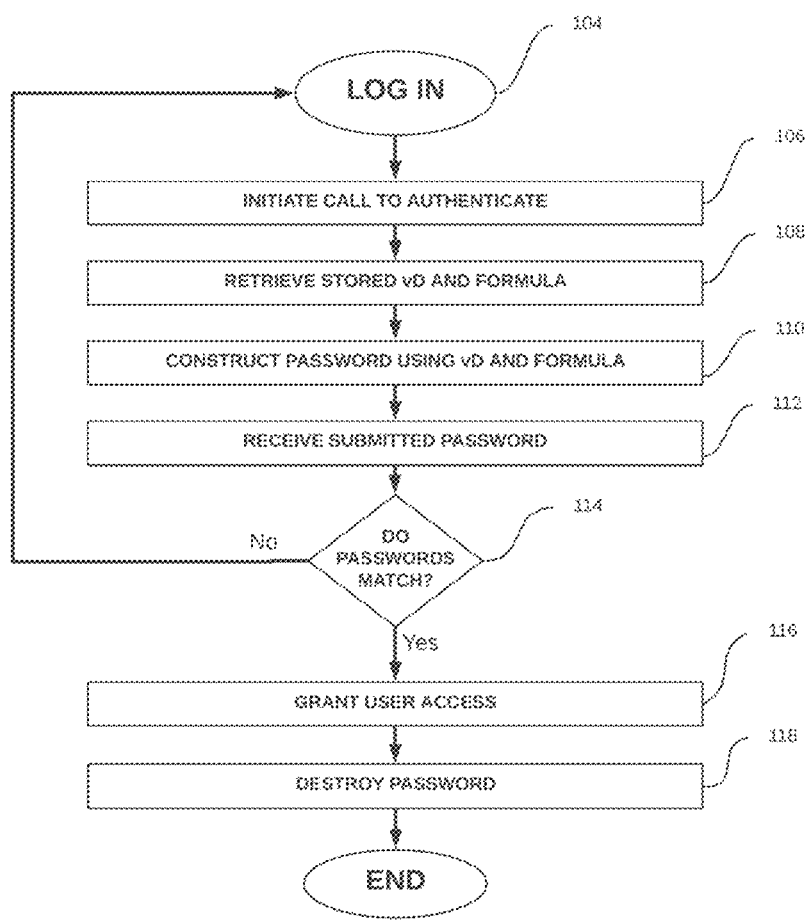
FIG. 1B is a process flow diagram for the login authentication by an Algorithm Server to an Authentication Server consistent with certain embodiments of the present invention.

Turning now to FIG. 1B, in an embodiment, at 104 a log in (authentication) is triggered at a TPV Web Server, which initiates an API call at 106 to authenticate the visitor's login credentials. At 108 the Algorithm Server retrieves the stored vD and specified Formula. At 110 the Algorithm Server applies the User-specified Formula to transform the vD and construct an authentic password. At 112 the Algorithm Server receives the submitted password. At 114 the Algorithm Server compares the submitted password to the constructed authentic password. If the passwords match, the User is granted access to the TPV services at 116. If the passwords do not match the User may submit another password. At 118 the Algorithm Server destroys the password without saving.

Figure 2A:
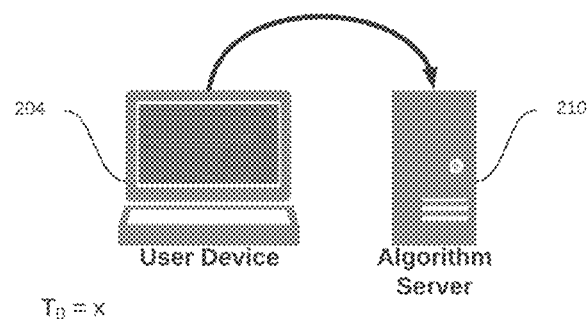
FIG. 2A is a system diagram describing communication at time $T_0$ between a user's device and an Algorithm Server consistent with certain embodiments of the present invention.

Turning now to FIG. 2A, this figure represents a system diagram describing communication at an initial time $T_0$, between a user's Device and an Algorithm Server consistent with certain embodiments of the present invention. In an embodiment, rather than performing the hopping actions manually, a User may configure an Algorithm Server to automatically perform the password hopping activity. At time $T_0$, User's Device 204 communicates Formula rules to an Algorithm Server 210. The Algorithm Server stores the Formula rules, in combination with any user-specified data associated with the Formula rules, such as non-variable data that may be utilized in the hopping rules configured by the user. The User's Device also communicates the DNS names of TPV sites where they have accounts, associated account details, and a schedule for when the time-variable passwords are to be hopped. When User configurations settings are submitted, the Algorithm Server begins to monitor and track the timing interval configured for use as the hopping frequency.

Figure 2B:
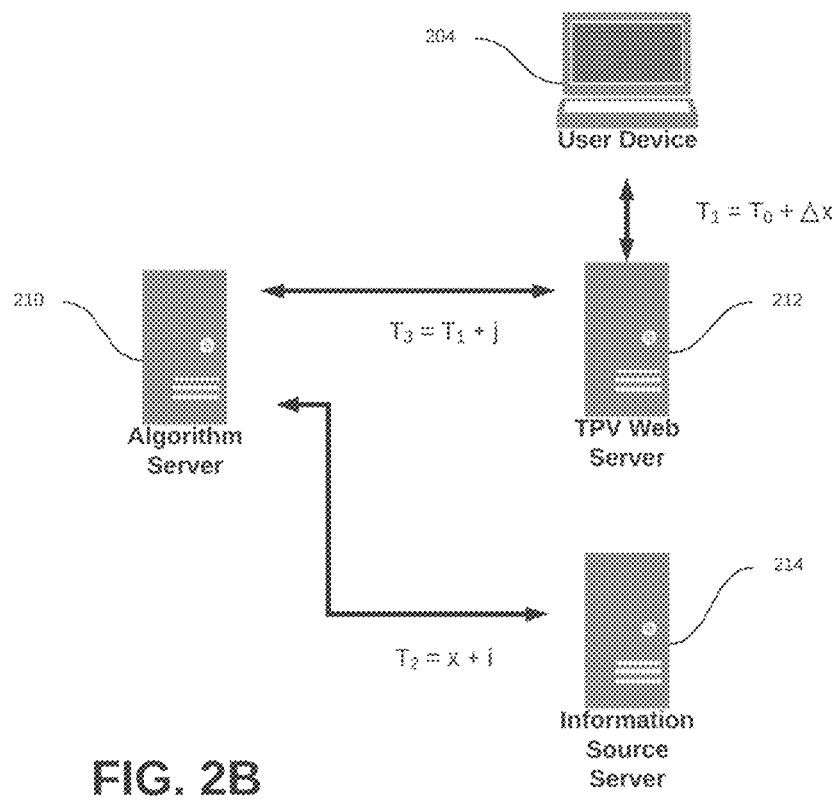
FIG. 2B is a system diagram describing communication at time $T_1$ between an Algorithm Server and Authentication Servers consistent with certain embodiments of the present invention.

Turning now to FIG. 2B, this figure presents a system diagram describing communication at time $T_1$ between a User Device 204 and a TPV Web Server 212, and communication at time $T_2$ between an Algorithm Server 210 and an Information Source Server 214, and communication at time $T_3$ between a TPV Web Server 212 and an Algorithm Server 210 with certain embodiments of the present invention. In an embodiment, the Algorithm Server 210 monitors the time and User hopping algorithm to determine if a password hop is required. At time $T_2$, the Algorithm Server 210 connects to a specified Information Source Server 214, and obtains time-variable data and stores it. Time $T_2$ is equal to time $T_0$ plus the specified time interval. At an unknowable time $T_1$ User Device 204 connects to TPV Web Server 212 to log in to their account. At time $T_3$ TPV Web Server 212 connects to Algorithm Server 210 with authentication request. The Algorithm Server 210 recalls stored time-variable data and applies user Formula rules, constructs an authentic password and compares it to the one received from the User Device 204. The Algorithm Server either communicates failure or success to the TPV Web Server. If authenticated, the User Device is granted access to the User account on the TPV Web Server. The Algorithm Server receives final communication from the TPV Web Server and destroys the hopped password. Time $T_3$ is equal to time $T_1$ plus a very small time interval (j).

Figure 3A:
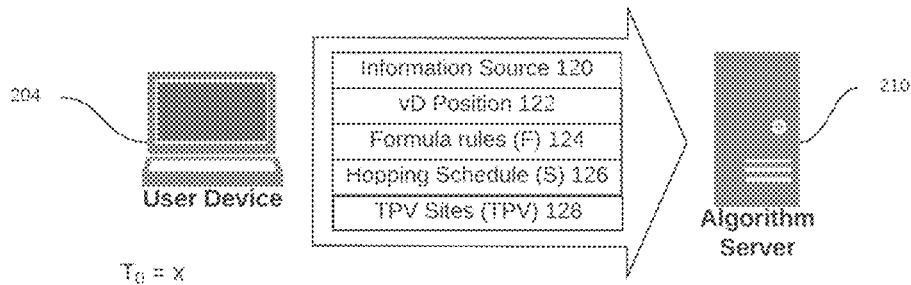
FIG. 3A is a system diagram describing the content of communication at time $T_0$ between user's device and an Algorithm Server consistent with certain embodiments of the present invention.

Turning now to FIG. 3A, this figure presents a system diagram describing the content of communication at time $T_0$ between user's Device 204 and an Algorithm Server 210 consistent with certain embodiments of the present invention. In an embodiment, utilizing either the manual method involving the user or initiating the automatic hopping algorithm operational at the Algorithm Server at the direction of user, the hopping algorithm is codified in an Information Source 120, a coordinate position for dynamic data 122, a Formula with one or more Formula rules 124, and a hopping Schedule composed at least of time interval, and/or a selected date and time 126. At time $T_0$, user's Device 204 communicates the following to the Algorithm Server 210: a Source 120, such as a dynamic news website, a coordinate position for time-variable data (vD) 122 (e.g.: the third word of the second news story on the user-specified website home page), a Formula (F) comprised of one or more rules 124, a specified Hopping Schedule (S) 126, and the domain names for one or more TPV web sites 128. Upon communicating this information to the Algorithm server 210, the system encrypts and stores the incoming data until such time that the elapsed time requires collection of vD or until such time as a TPV Web Server calls for authentication of a User.

Figure 3B:
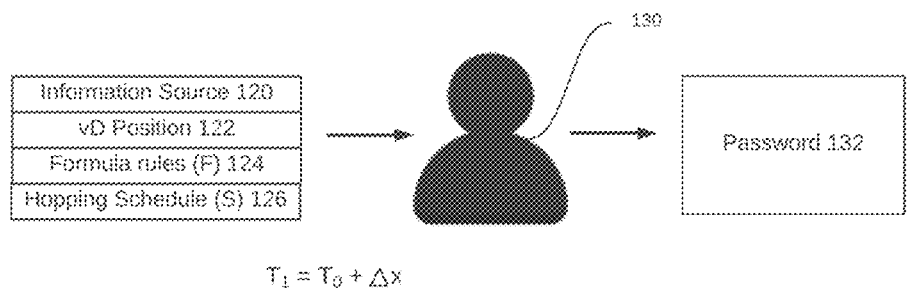
FIG. 3B is a system diagram describing the retrieval of the current user's password consistent with certain embodiments of the present invention.

Turning now to FIG. 3B, this figure presents a system diagram describing the User's construction of their current password at time $T_1$ consistent with certain embodiments of the present invention. In an embodiment, at any time user wishes to log in to a TPV web site, a User 130 may read the information source 120 and identify time-variable data at a specified position 122 and during the current time interval 126. The User applies the specified Formula 124 to vD and constructs the present password 132. Due to the fact that one or many hop time intervals may have elapsed since the last time that the user authenticated, the user must provide certain correct information to the Authentication Server to pass the authentication test. Knowing the hopping schedule (S) (time interval) 126, User 130 references the specific data position 122 associated both with the pre-configured Formula rules and the Schedule on source 120 to discover the time-variable data specified for use in the construction of the password for each hop cycle. The user 130 further applies additional actions that may be required by the Formula including, in a non-limiting example, any transform rules and any non-variable character string rules that may have been included in the pre-configured Formula and may be required in the construction of the current password 132. The User may then submit the current password for authentication regardless of the number of hop time intervals that may have elapsed since the last time the user authenticated with a TPV web site.

Figure 3C:
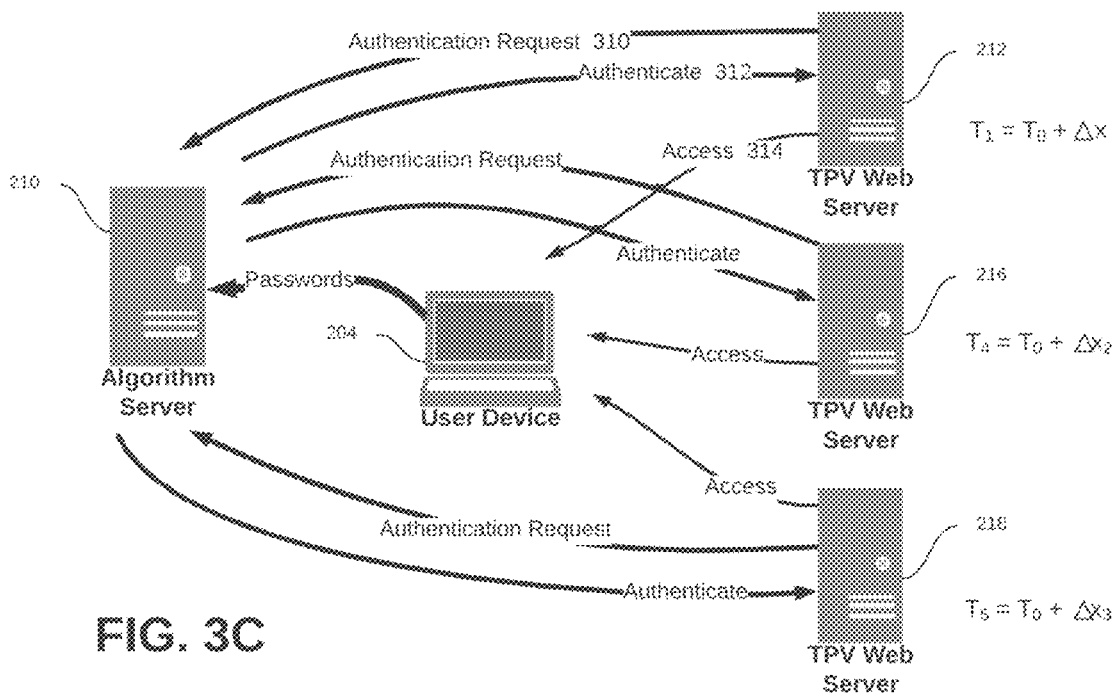
FIG. 3C is a system diagram describing communication of user's password to Authentication servers consistent with certain embodiments of the present invention.

Turning now to FIG. 3C, this figure presents a system diagram describing User authentication to a variety of TPV Web Servers at various times consistent with certain embodiments of the present invention. In an embodiment, the User, utilizing the latest hopped password to access the private content of a TPV Web Server 212 initiates authentication via User's Device 204 at time $T_1$. The TPV Web Server 212 requests authentication 310 from the Algorithm Server 210 and facilitates a connection to the User Device. The User submits their hopped password (constructed for the current time interval per their specified Formula paired with the TPV web site.) The Algorithm Server 210 constructs the authentic password using the particular specified Source and Formula (paired to the particular TPV web site and user account). If the User-communicated password is authenticated (matched with the authentic constructed password) the TPV Algorithm Server authenticates 312 the User to the TPV Web Server 212. The TPV Web Server grants access 314 to the User Device. In an embodiment, The User may specify different Sources and Formulas for pairing with different TPV web sites and may also specify different hopping Schedules, composed of time intervals and/or pre-specified dates and times, for different TPV web sites. In an embodiment, the Algorithm Server authenticates the User to a plurality of TPV Web Servers 216, and 218 at times $T_4$ and $T_5$, respectively, with a plurality of paired Sources, Formulas, and hopping Schedules to grant access to User private data. And times $T_1$, $T_4$, and $T_5$ may or may not occur during the same time hopping interval (i).

Figure 4:
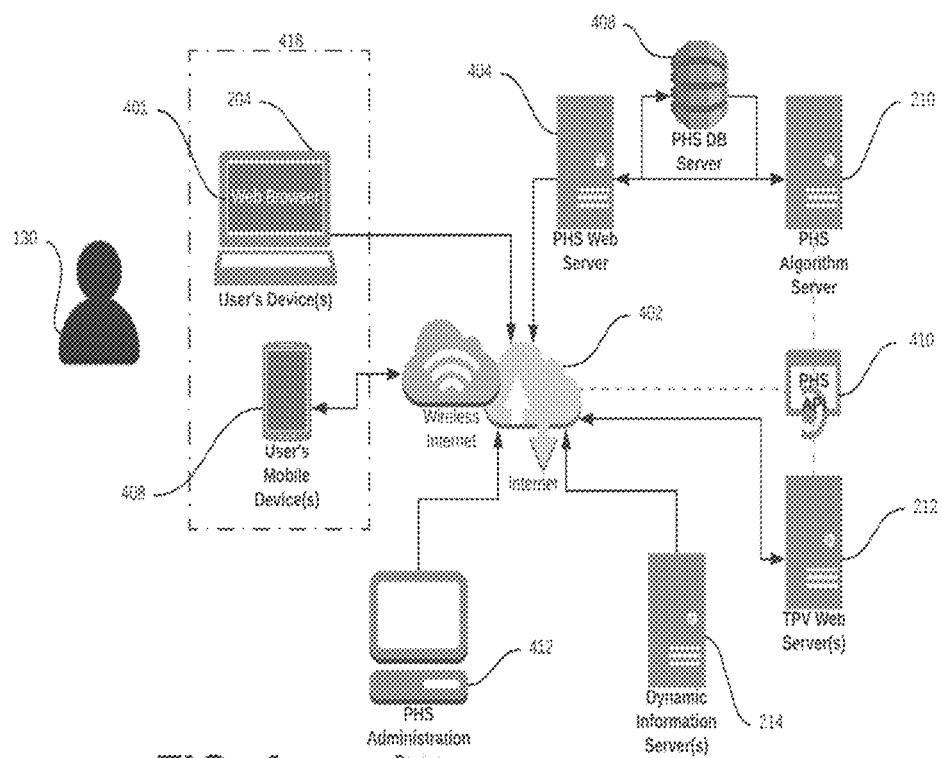
FIG. 4 illustrates the major components of the Password Hopping System consistent with certain embodiments of the present invention.

Turning now to FIG. 4, this figure presents the major components of the Password Hopping System and external component dependencies. In an embodiment, the PHS is predominantly a software application with supporting hardware components. In the current instantiation, the PHS software is a web application 401 that operates from within a web browser and is hosted across multiple servers connected to the Internet 402. In an embodiment, the PHS system software may be hosted on a PHS Web Server 404 in communication with a PHS Algorithm Server 210. But other possible instantiations include a mobile application implemented on a user mobile device 408, such as an iOS or Android application, a stand-alone computer application, such as, in a non-limiting example, an application that might be used on a home network to hop passwords for IoT device access, or a daemon, such as might be used inside a network center to hop ports between network servers. In the current instantiation, the PHS includes a web server 404, a database server 408, an Algorithm Server 210, an Application Programming Interface (API) 410, and an administration device 412. The PHS also includes a plurality of Users 130 and User devices (mobile or otherwise) 418, and a plurality of TPV web servers 212, and a plurality of servers hosting dynamic information sources 214.

In an embodiment, in addition to the various computing resources that comprise the PHS implementation, the PHS requires a time-variable information Source, a specified Formula, and a user- or source-specified hopping Schedule as inputs to the hopping algorithm. The output of the PHS is a plurality of passwords constructed and replaced automatically according to pre-configured hopping Schedules.

Figure 5:
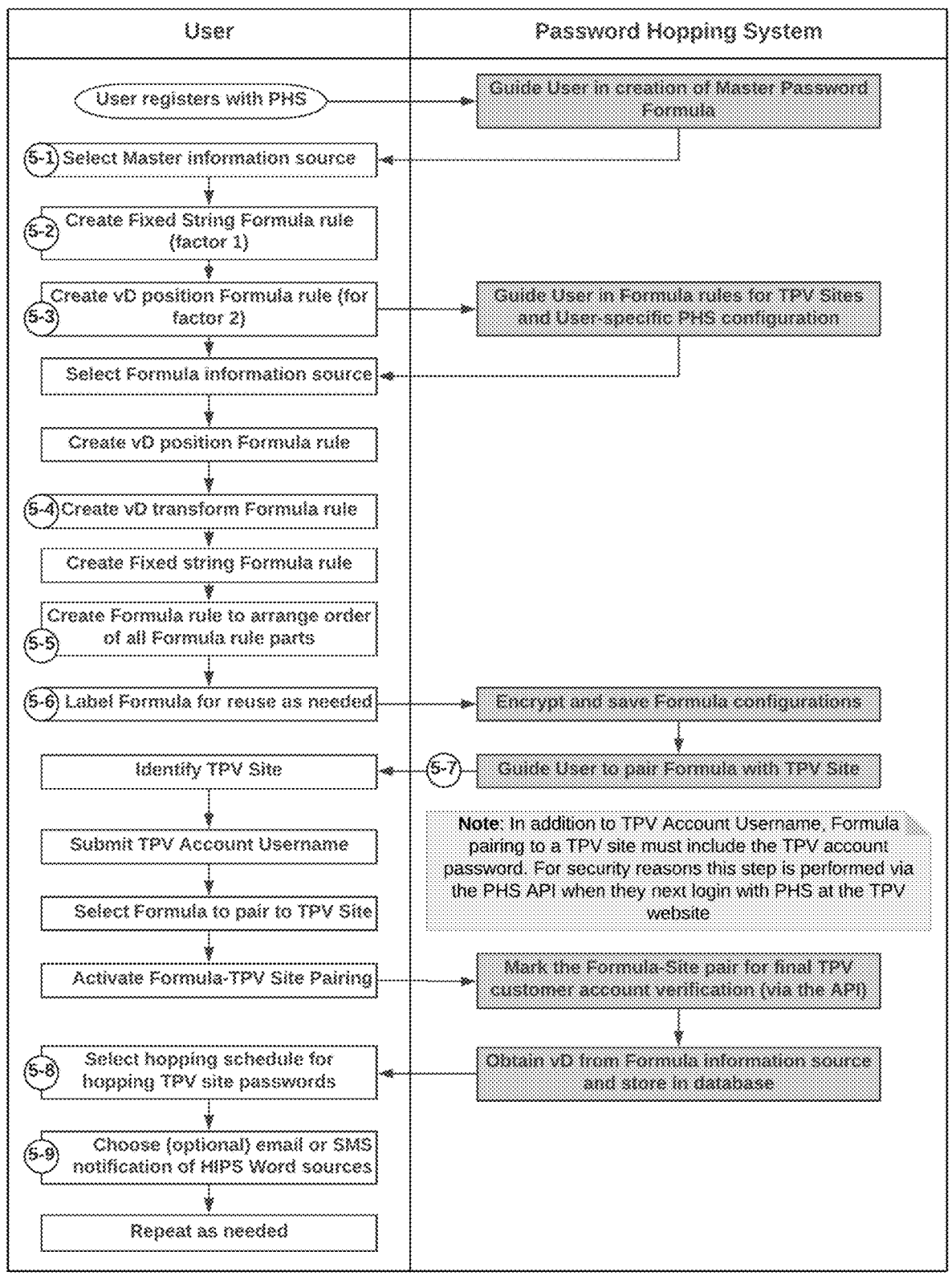
FIG. 5 illustrates that PHS Web and Database Servers provide user interfaces for User configuration of hopping algorithm including, but not limited to, Formula(s), Hopping Schedule(s), and any optional notifications consistent with certain embodiments of the present invention.

Turning now to FIG. 5, this figure illustrates that the PHS provides user interfaces for guided User configuration of user-specific operating parameters. Following a series of guided activities, Users create password Formulas, pair their Formulas with specific TPV sites, schedule the timing of password hops (changes), and configure notifications. These steps include but are not limited to the following:

At 5-1, User creates a master password Formula to construct hopped master passwords for user access to their PHS data such as, but not limited to, hopping algorithms, Sources, Formulas, rules, Sites, and notifications. In an embodiment The Master Password Formula uses an information source that is isolated from information sources used in other TPV site Formulas. The source must present dynamic information that changes at least as frequently as the scheduled time interval for password hopping.

At 5-2, a fixed character string is collected from the User, encrypted, and stored. The fixed string represents the first factor in 2-factor authentication.

At 5-3, the position of one or more variable character strings (vD) within the Source is identified by the User. In a non-limiting example, for a news web page the character string selected might be defined by a headline position and the position of a word in the headline, such as first headline, first word.

At 5-4, because a single word may be too short to provide strong security (i.e., words such as "and", or "the") even for a short hopping time interval, the User may define a Formula rule to transform the vD and increase its entropy and reduce its guess-ability (its characteristics informing its likelihood of being guessed) for greater security without compromising its simplicity. In a non-limiting example, transformations include changing selected lowercase letters to uppercase, changing selected letters to numbers, adding special characters, adding numbers, and other transformations that include appending, prepending, adding, subtracting, substituting, tagging, or similar alterations on a character-by-character level.

At 5-5, because a Formula constructs replaceable and disposable passwords using a series of multiple Formula rules, and each rule produces or alters a part of a hopped password, the multiple parts may be composed of fixed strings and one or more dynamic strings. in a non-limiting example, a Formula arrangement rule allows the User to arrange order of the password parts constructed from other Formula rules.

At 5-6, the User's Formula is labeled for easy reference and reuse by the User when Formulas are paired with TPV web sites.

At 5-7, a User's Formula is paired, or coupled, with the User account at a TPV web site. Pairing defines which User Formula to apply when a hopped password is constructed and ensures that a specific User account at a TPV site is authenticated by the Algorithm Server Pairing a Formula to a TPV Site and User account includes identifying the TPV site, obtaining the User login name (e.g., email address) and the User account password (the static password stored by the TPV). For security reasons, the User account password is only submitted by the User to the TPV (it is never received by the PHS) at their first login after initiating a Formula-site pairing. The User also identifies the Formula to pair and activates the pairing, which begins the password hopping activity for that TPV Site.

At 5-8, a hopping schedule, composed of a time interval and/or a date and time, is specified by the User. Hopping may occur at User-selected time intervals, or by conditional changes with the information source, or on-demand such as at the time of authentication by a User at a TPV site.

At 5-9, The Algorithm Server never communicates hopped passwords. But it may, at the request of a User, provide a notification of the current information source to the User when a password hop occurs. Notifications, such as an email or text message, contain the source information, such as a news story headline, necessary for constructing the hopped password and assist them in constructing their hopped password using their remembered Formula. For security reasons the notification includes multiple versions of source information of which one is the correct source for the User Formula.

Figure 6:
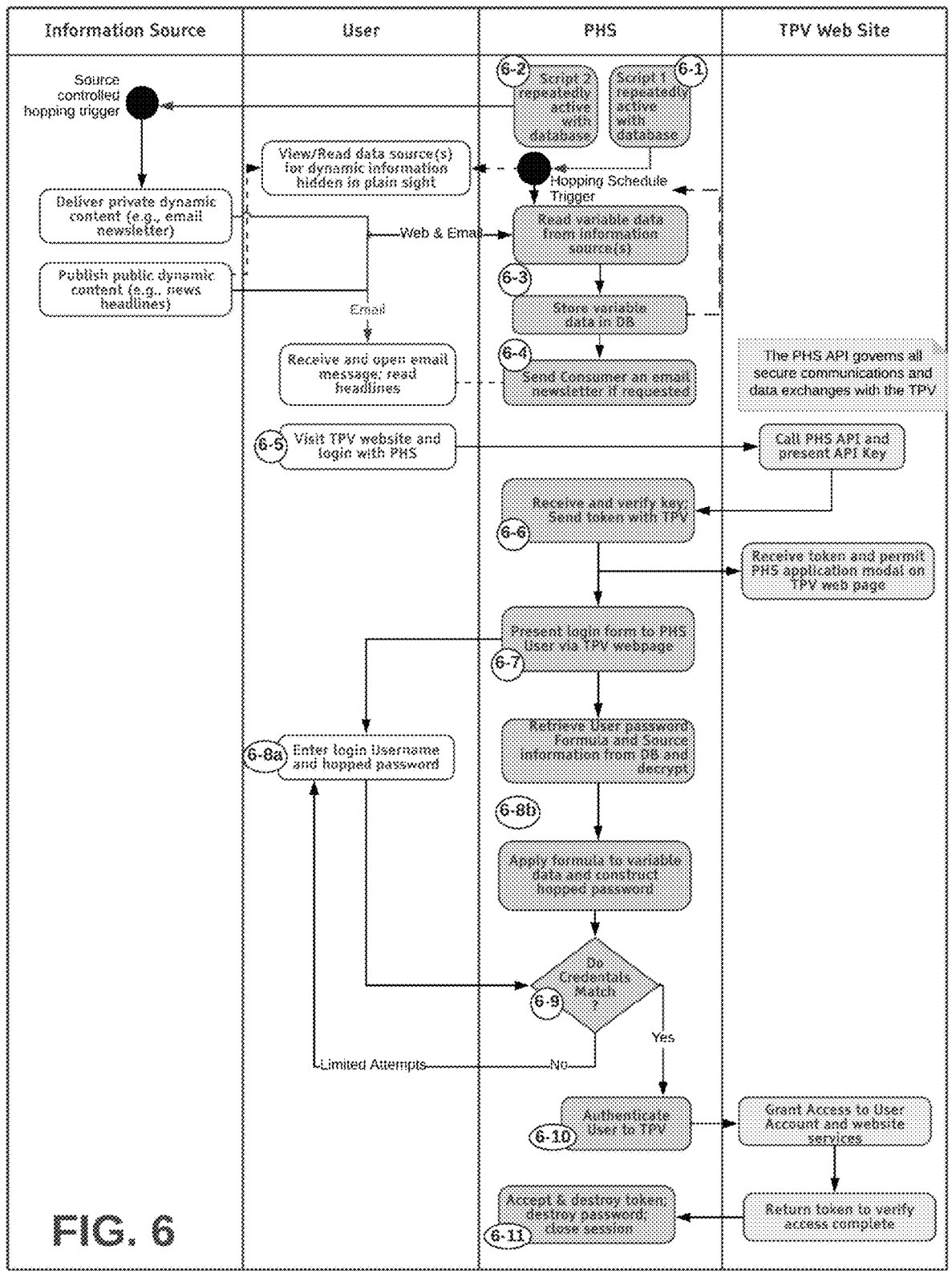
FIG. 6 illustrates functions of the Password Hopping System (in a web application instantiation) for authentication of User accounts at a third-party website consistent with certain embodiments of the present invention.

Turning now to FIG. 6, this figure illustrates the functions of the PHS in the exemplary embodiment of a web application for authentication of User accounts at a TPV web site after User-specific configuration of the Algorithm Server is completed. At this point, the User and the Algorithm Server agree on how a password will be constructed and the TPV Site where it will be used. A script 6-1 within the PHS is activated repeatedly at very short, time intervals. The script queries the PHS Database Server to identify and select User records whose hopping schedule matches the current time. When a record is found, the script initiates a password hop activity.

In an alternative embodiment, a password hop may be triggered by an external action or schedule rather than by a User-specified or system-specified time stored in the PHS Database Server. In this alternative embodiment, the password hop is triggered by a change in the vD source, such as, in a non-limiting example, a news headline update, or by receipt of new source information, such as, in a non-limiting example, an email newsletter arriving in an inbox. In this alternative embodiment, a second PHS script 6-2 is activated repeatedly at very short intervals, and the script queries the appropriate information source to detect vD changes. If the query returns "true", then a password hop is triggered.

In an exemplary embodiment, the trigger for a password hop initiates Algorithm Server activities to access, collect, and store 6-3 time-variable data from the User-specified information source. If the User configured the Algorithm Server to send courtesy notifications, the PHS provides a notification to the User 6-4. At Time $T_2$ the User initiates a login to a TPV web site that has previously integrated the PHS API and obtained their secret API Keys 6-5. The TPV Web Server activates the PHS API and calls the Algorithm Server for authentication of the User. The TPV Web Server call includes presentation of PHS API Keys which the PHS Authentication Server must verify 6-6. Tokens are exchanged between the two servers to permit PHS user interface modals to be presented to the User at the TPV web site, and the PHS presents its authentication form to the User 6-7. The user submits their TPV account username or email address and their current hopped password 6-8a. Concurrently, the Algorithm Server retrieves and decrypts the User stored data (Formula and time-variable data) and constructs the authentic password 6-8b. Upon receiving the User's submitted login credentials, the Algorithm Server compares them with the authentic credentials 6-9 and, if a match occurs, the PHS authenticates the User to the TPV web site 6-10. The TPV Web Server grants User access to their TPV account and returns tokens to the PHS to verify successful completion, at which time the PHS destroys API tokens, User password, and closes the session with the TPV 6-11.

Figure 7:
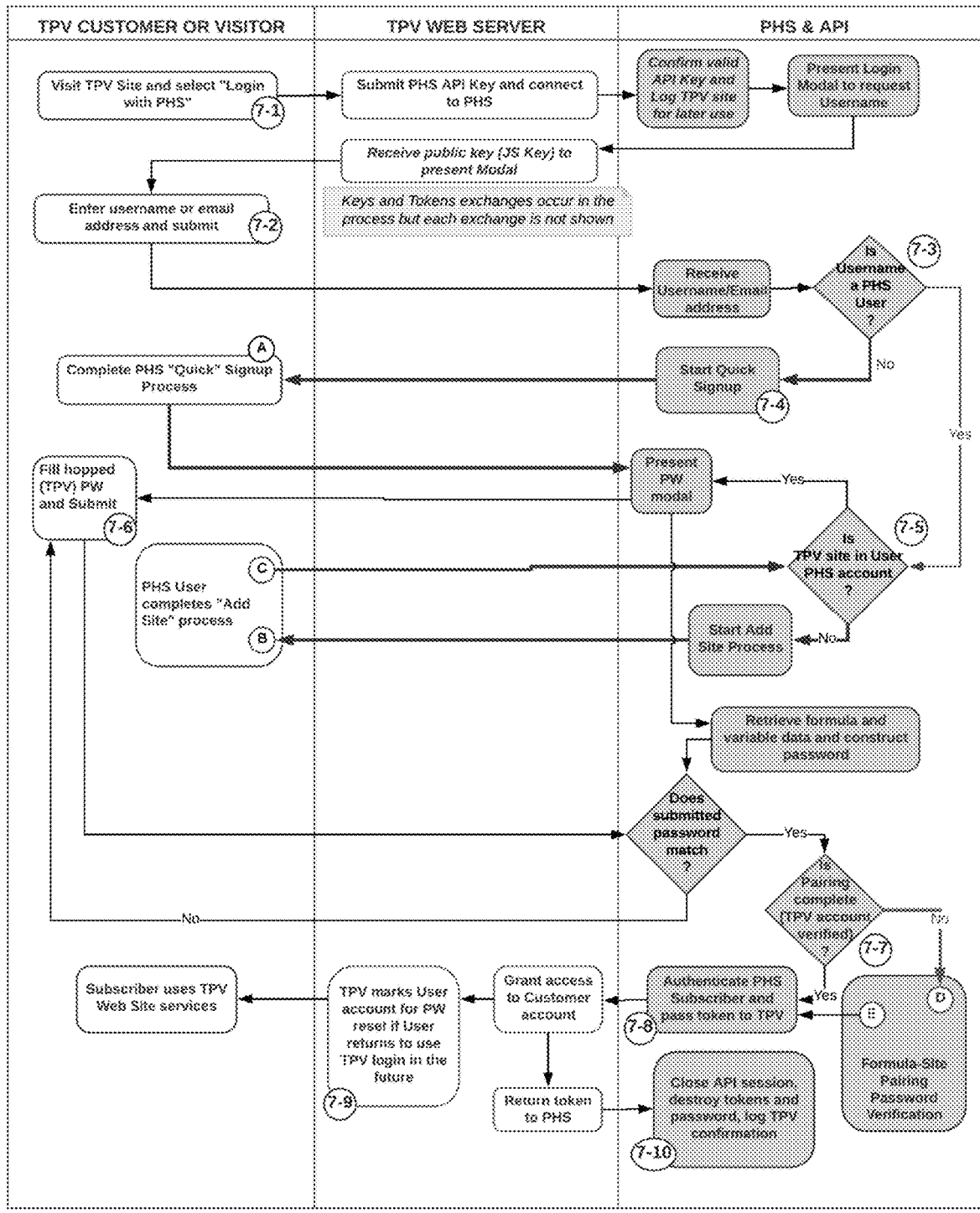
FIG. 7 illustrates that PHS Authentication is paired with verified Third Party Vendor (TPV) Customer accounts and several API branches may occur to provide Users additional system functions from a TPV website consistent with certain embodiments of the present invention.

Turning now to FIG. 7, this figure illustrates the PHS API functions and activities with the User and TPV Web Server at Time $T_2$. The activities include a one-time verification of User TPV account password by the TPV. This verification is the final step in the Formula-site pairing started by the User in their configuration of user-specific PHS services.

In an exemplary embodiment, a TPV hosts a website offering products, services, or information to authorized users. TPV customers that are authorized users have accounts and login credentials such as username, email address, and a password. The TPV may also have 'visitors', which are users without accounts, to their web site. Some of these visitors may or may not be Users of the PHS. The TPV also has accepted and integrated the PHS API on their web server and obtained API Keys from the PHS. The PHS API is an essential element of PHS operation and configuration and controls the communication and transfer of data between the TPV Web Server and the PHS, including replication of certain PHS User configuration functions such as adding and pairing a TPV web site to a User's PHS Formula, or upgrading their PHS services, or creating an TPV account.

In an exemplary embodiment, a TPV registers with the PHS and receives a unique API Key, Username, and Password Formula. The API controls four activities between the TPV and the PHS during a User login at a TPV web site:
1) authenticate a PHS User/TPV Customer to their TPV account at login;
2) add the TPV site to the User's PHS account and pair it with a User Formula
3) Upgrade PHS services if the User's service capacity has been reached.
3) Signup (create account) a TPV Customer with the PHS and pair their TPV account to a PHS Formula and hopping Schedule; and
4) Signup (create account) a TPV Visitor with the PHS, create a TPV account for them on the TPV site, and pair that account with their PHS Formula.

In an embodiment, in accordance with an API agreement, the TPV web server displays a "login with PHS" button on the TPV login page 7-1. TPV site visitors or TPV customers or PHS Users click the button and use the PHS to authenticate their access to their TPV account. When the "Login With PHS" button is used, the API loads I-Frames from the PHS web server onto the TPV pages. The content of the API I-Frames originates with the PHS Web Server, and any User interactions, such as in a non-limiting example, submit button clicks and data submission, occur with the PHS Web Server rather than the TPV web server.

In an embodiment, the PHS receives API keys, provides security tokens, and provides a series of user interfaces (UIs) to collect the User's PHS username 7-1. The PHS determines if the User is currently registered with the PHS 7-3, and if not, it serves the User with a series of I-Frames to guide the User through a signup process 'A', 7-4. If the User is registered with the PHS, the PHS tests if the TPV Site that the User is logging into is included in their PHS Formula-Site pairings 7-5. If the TPV Site in not in the User's Formula-site pairings, then a branch (B-C) of activities is initiated to add the site and pair a Formula (see FIG. 8) If the Site is in the User's Formula-site pairing list, the PHS requests, and the User submits, their hopped password 7-6 for authentication. If the User-submitted password matches the PHS-constructed authentic password, the PHS checks if the User TPV account has been fully verified or not 7-7. If Formula-site paring is not complete. The PHS initiates a branch (D-E) of activities to complete the Formula-site pairing with the User submission of their TPV account password to the TPV Web Server (see FIG. 11). If the Formula-site pairing is complete, then the PHS authenticates the User to the TPV Web Server 7-8. The PHS issues a "Reset PW" alert to the TPV so the TPV may replace the TPV User password in its database with a long randomly generated password and identify the User account for a password reset should the User return to using the TPV login system in the future 7-9. This ensures that an aging unused password does not remain within the TPV databases exposing the account to risk of breach and destroys tokens and password and closes the authentication session 7-10.

Figure 8:
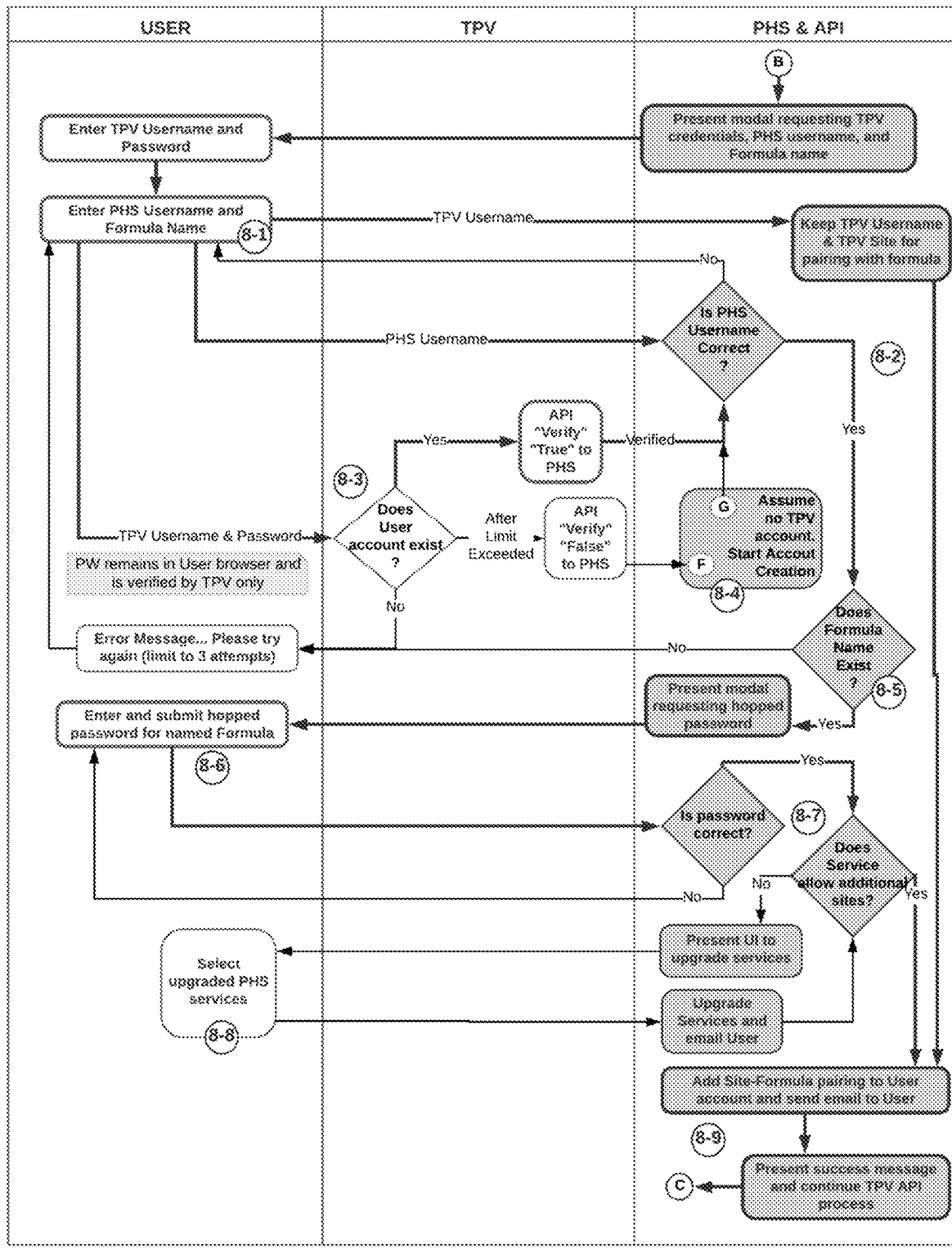
FIG. 8 illustrates that the PHS API includes a process branch to add (pair) a TPV website to a User Formula in the Algorithm Server consistent with certain embodiments of the present invention.

Turning now to FIG. 8, this figure illustrates the PHS API branch to add and pair a TPV web site to a User Formula in the PHS when the TPV Site is not presently listed and paired.

In an embodiment, the PHS requests the User/Customer's TPV Username or email and TPV Password and their PHS Username and Formula name for pairing with the TPV site 8-1. The TPV password may be used to ensure the PHS pairs uniquely with the User's TPV account. The User's PHS Username and the Formula name may be used to determine how to construct hopped passwords for the paired TPV site. The entered TPV Username is sent to the PHS where the PHS tests for a valid account 8-2. The entered TPV Password remains within the browser and is readable only by the TPV 8-3. If correct, the TPV verifies the account to the PHS. If not, then the PHS assumes a TPV user account does not exist and a branch (F-G) to create a TPV account is activated 8-4. If the PHS Username is valid, then the PHS tests the Formula name for existence or correctness 8-5. If the Formula name is valid, then the PHS requests the User submit the hopped password for the Formula 8-6. If the submitted hopped password is authentic, then the PHS tests the capacity of the User's service and confirms the User's services have capacity to add the TPV Site 8-7. If the User's service does not have capacity to add the TPV site, then the PHS presents user options to upgrade their service 8-8. If the User's service has capacity, then the Formula is paired with the TPV site and Customer account. The "add site" sub-process ends with a return to the API's main authentication process 8-9, previously described in FIG. 7.

Figure 9:
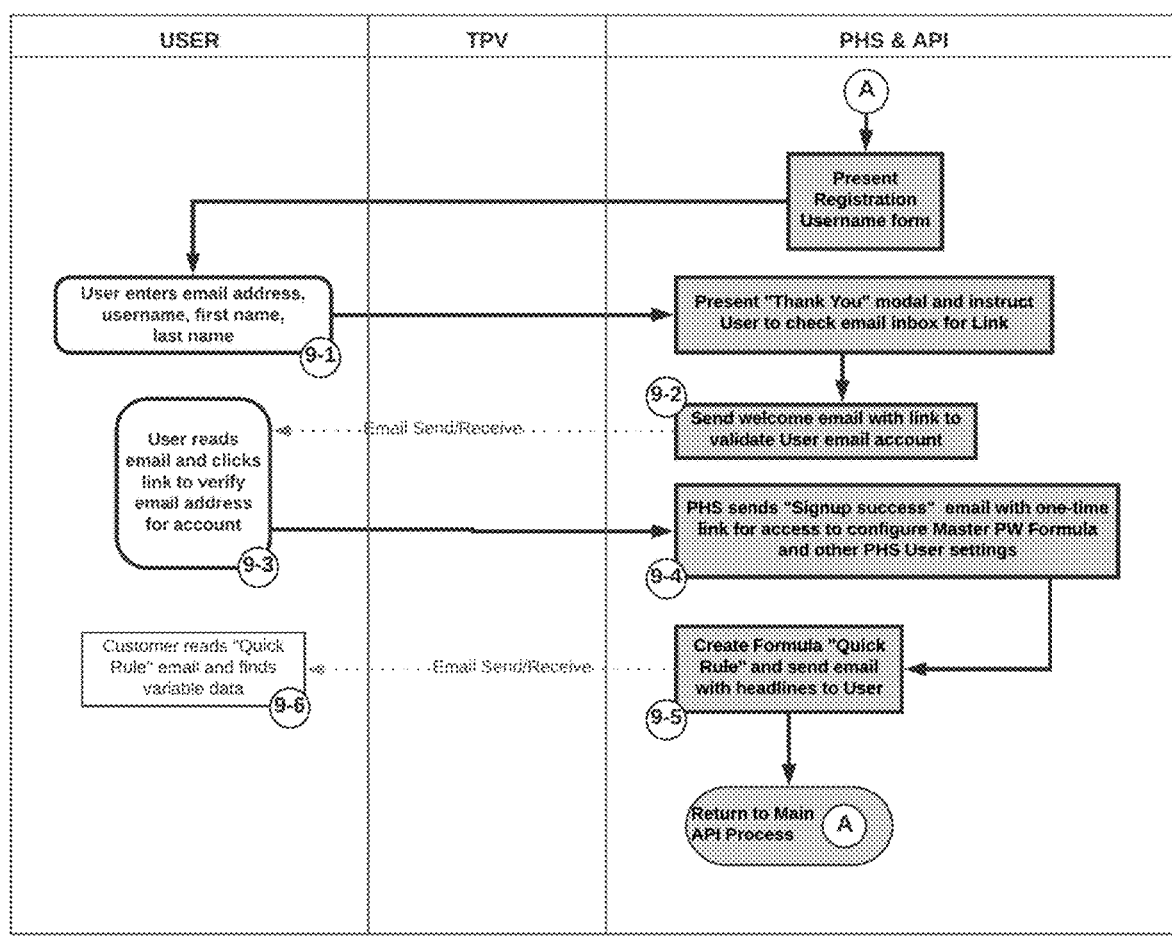
FIG. 9 illustrates that the PHS API includes a process branch for "quick signup" of TPV Customers who wish to use the PHS consistent with certain embodiments of the present invention.

Turning now to FIG. 9, this figure illustrates the PHS API process branch for "quick signup" of TPV Customers who wish to use the PHS. The PHS provides a series of I-Frames to sign up an existing TPV Customer as a temporary PHS User and to create a PHS account.

In an embodiment of this API process branch, TPV Customers (Users) who wish to use password hopping must first signup with the PHS and create an account. This process branch includes selection formula consisting of a unique Username and creation of a Master Password Formula 9-1. The PHS then sends the Use an email to validate the submitted email address is correct (the email contains a link to the PHS which the User must click) 9-2. The User receives the email and clicks the link 9-3 and receives a second email with a one-time link to access a PHS form to configure their Master Formula 9-4. The PHS chooses an abbreviated Formula "quick rule" 9-5 and sends the rule and instructions to the User for use in later API processes 9-6, as previously described in FIG. 7.

Figure 10:
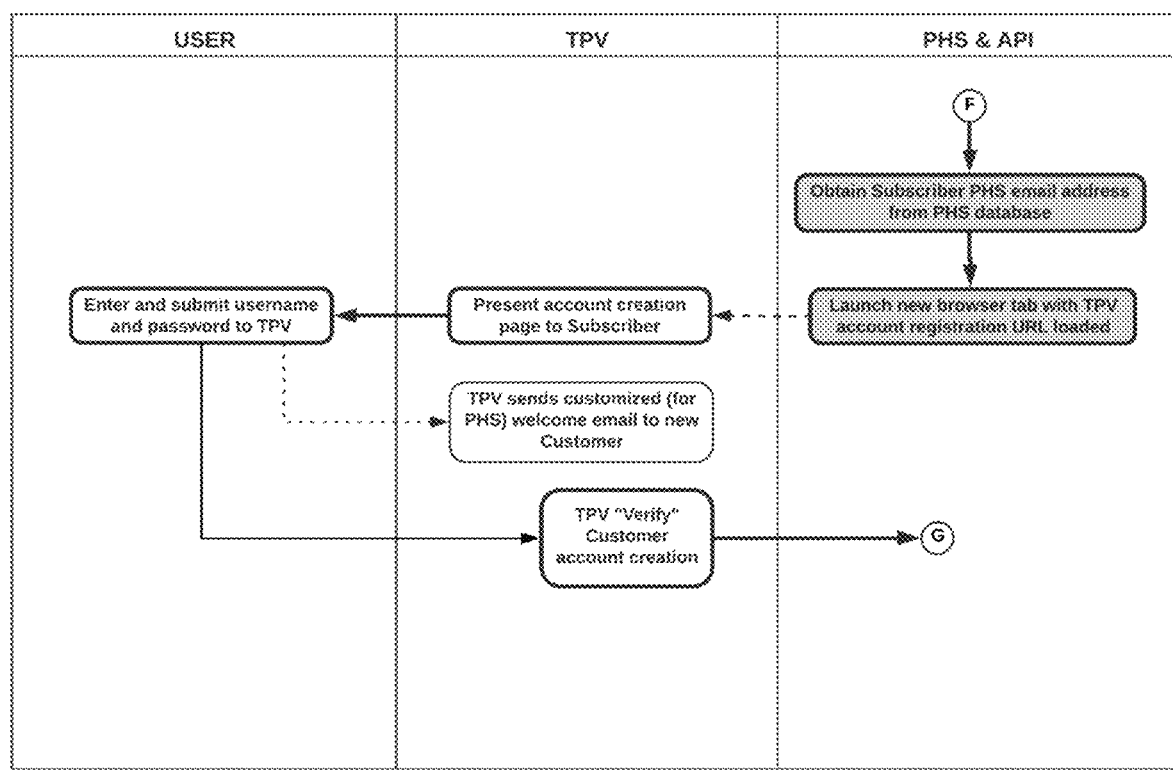
FIG. 10 illustrates that the PHS API includes a process branch to create a TPV account at the time of pairing if a TPV account does not yet exist consistent with certain embodiments of the present invention.

Turning now to FIG. 10, this figure illustrates the PHS API process branch to create a TPV account during API Formula-site pairing if a TPV account for the User cannot be verified by the TPV. In a non-limiting example, PHS assumes a TPV account does not yet exist for the user. The PHS provides a series of I-Frames to the User to create a TPV Customer account if one cannot be found. In this example, Formula-site pairing requires a TPV account.

In an embodiment, this API process branch is very similar to registering a TPV User with PHS, however in this instance there is not a TPV Customer account to match as part of the Formula-site pairing process. A User who is a TPV visitor may use the PHS API to signup, create a "quick formula", add the TPV site to their PHS service, and authenticate to the TPV web server.

Figure 11:
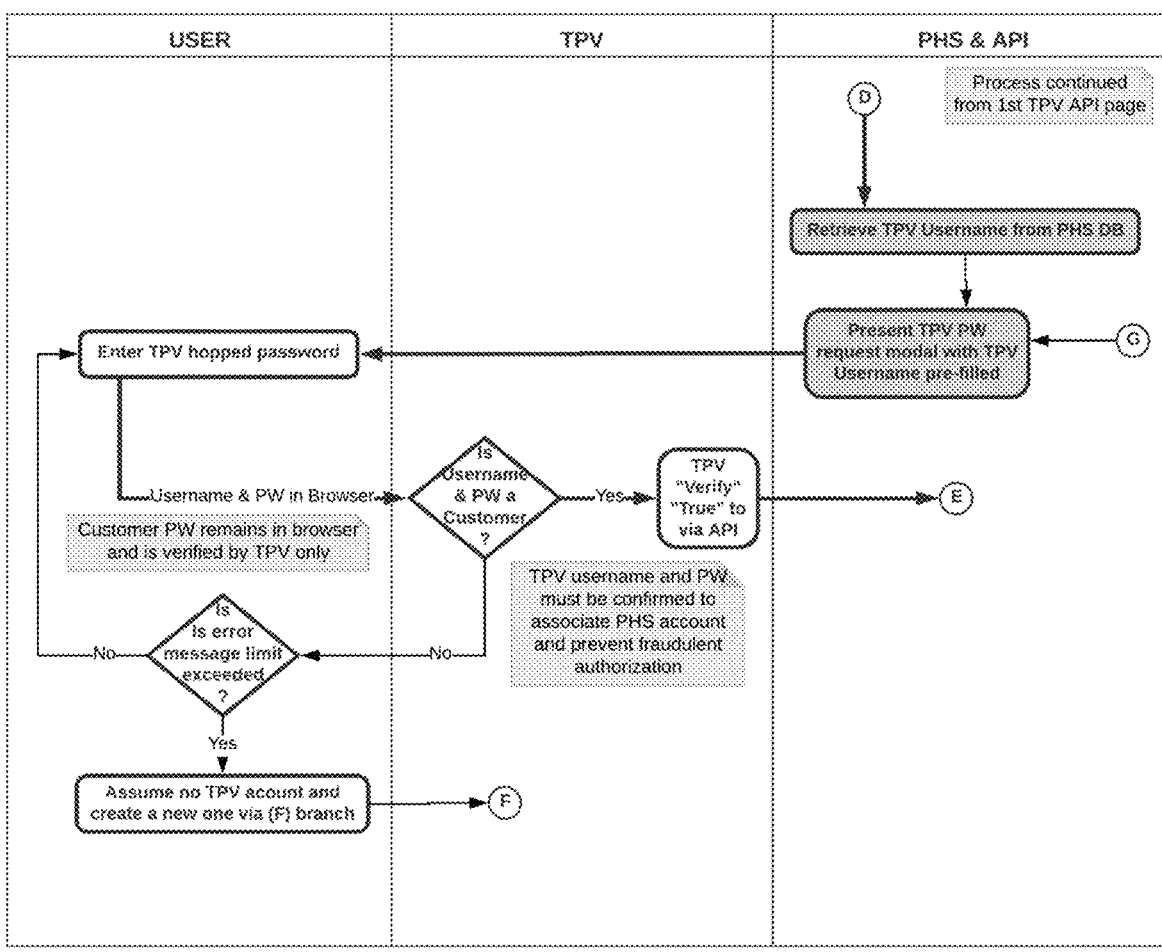
FIG. 11 illustrates that the PHS API provides final TPV account verification with the User's TPV account password and password hopping is fully configured consistent with certain embodiments of the present invention.

Turning now to FIG. 11, this figure presents the PHS API activity of final TPV account verification through the submission of the User's TPV account password in the PHS Formula-site pairing process, as described previously in FIG. 5. Although password hopping may have been activated earlier in time, for security reasons, the final step in pairing of a Formula with a User account at a TPV web site only occurs via the PHS API. Verification is performed only by the TPV using the PHS API and requires the User to supply their TPV Customer password to the TPV rather than to the PHS. In a non-limiting example, the Formula-site pairing performed within the PHS, the User submits the Site name selected and their TPV account username or email address to the PHS, which stores the information for use with the PHS API the next time the User logs in to the TPV site using the PHS. On that first login using PHS, the PHS recognizes the TPV account pairing has not been verified and presents the User with a field for entering the TPV account password. The User's TPV password remains in the browser where it can be verified, or rejected, by the TPV. In this embodiment, the User's TPV password is not sent to the PHS. If verified, the TPV reports true to the PHS; if not verified the TPV reports false. A false report may be due to the User not having an account on the TPV site, so the PHS may allow the User to create a new TPV account, as described in FIG. 10. A verified TPV response completes the PHS Formula-site pairing to a specific TPV Customer account.

Figure 12:
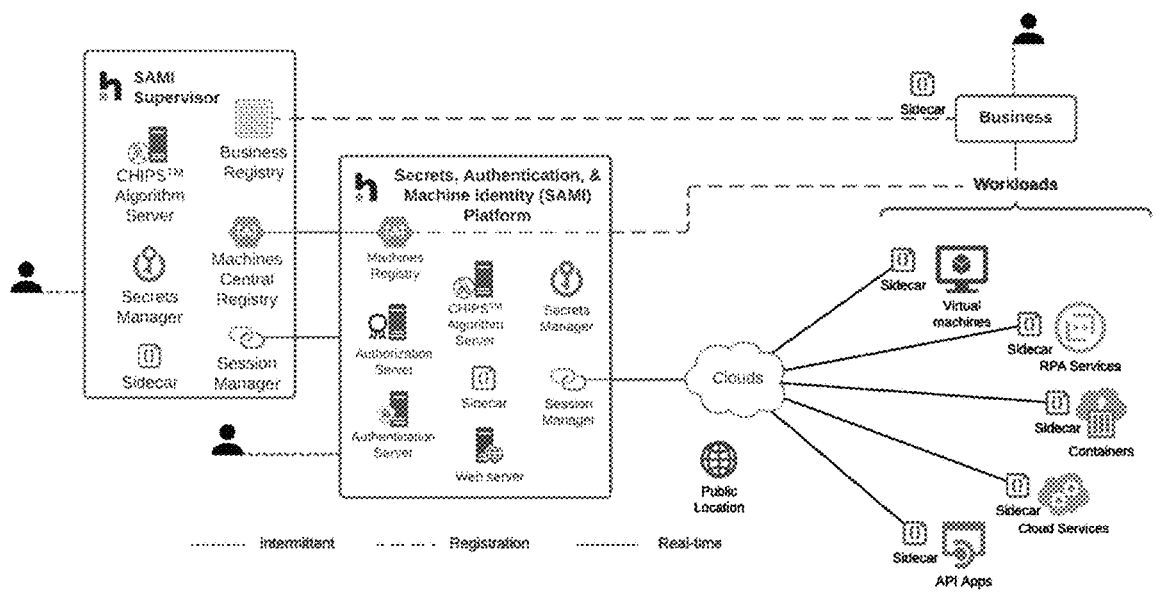
FIG. 12 illustrates the top-level technical architecture of the instant innovation's Secrets, Authentication, and Machine Identity (SAMI) system consistent with certain embodiments of the present invention.

Turning now to FIG. 12, illustration of the top-level technical architecture of the instant innovation's Secrets, Authentication, and Machine Identity (SAMI) system consistent with certain embodiments of the present invention is shown. At 1200 the interconnecting lines indicate that various components may perform at various times. Some may operate at registration when identities are established; others may operate intermittently as needed, such as workload interactions; and still others may operate in real-time during machine-to-machine interactions.

In an embodiment, the technical architecture may be a recursive functional design. Similar or identical functions may be repeated by the same SAMI apps at different levels of the architecture, yet for different purposes.

In an embodiment, the SAMI Supervisor is responsible for overseeing the operations of multiple SAMI Platforms, while a SAMI Platform is responsible for overseeing the operations of multiple business workloads within the cloud. In an embodiment, the SAMI Supervisor performs similar activities as the SAMI Platform, but only for supervising the SAMI apps within the platform. These apps may interact with one another, and the SAMI Supervisor provides both sidecar management for the SAMI Platform app sidecars and a business registry within the SAMI Supervisor. In an embodiment, both the platform and the supervisor have human administrators.

In an embodiment, the SAMI Supervisor is a supervisor application that runs continuously and monitors operations of other apps (machines) performing within a SAMI Platform. The supervisor application may perform the following functions:

Registering and verifying business domains (x.509 Certificates), during which function a Business Identity is verified with a valid Domain Certificate from an authoritative source such as, but not limited to, a Certificate Authority. The Business Identity may include a human administrator at the business;

Aggregating machine identities from multiple SAMI Platforms;

Synchronizing machine identifies among multiple SAMI Machine Registries to prevent duplication and enable discovery of machine identities across the registries;

Correlating Machine Identity aliases with business domain certificates;

Maintaining a record of machine identity relationship maps; and

Managing SAMI Platform app sessions and secrets by the use of Sidecars.

Figure 13:
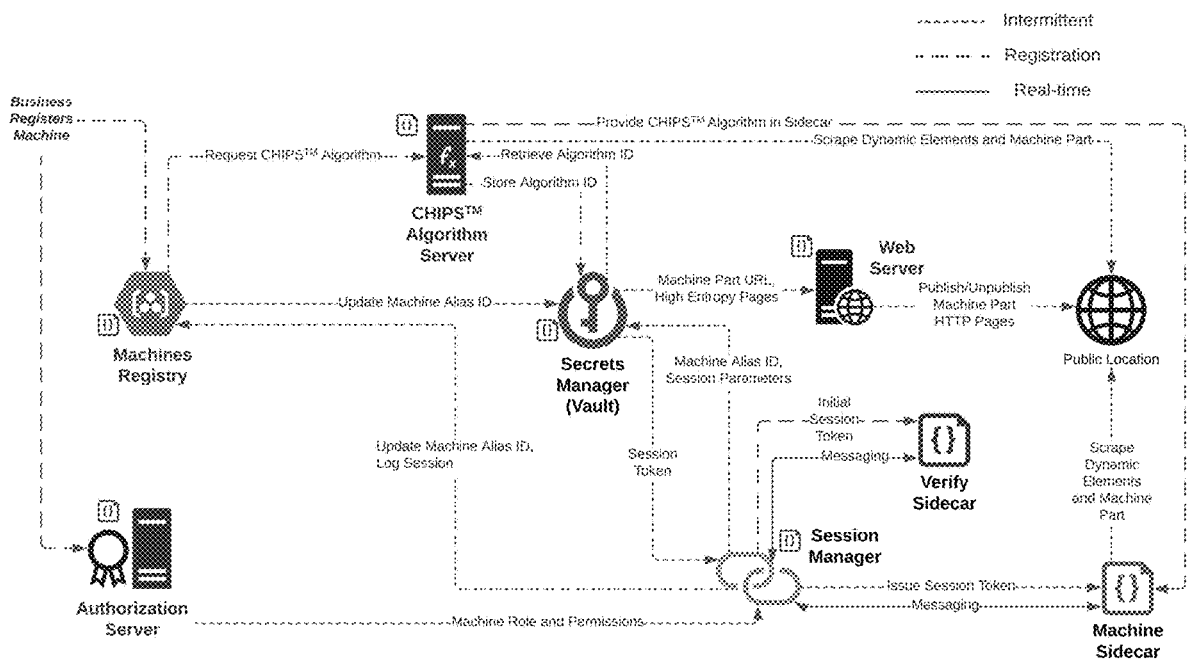
FIG. 13 illustrates the SAMI Platform for authenticating machines, and brokering and managing machine-to-machine interactions (sessions) consistent with certain embodiments of the present invention.

Turning now to FIG. 13, illustration of the SAMI Platform for authenticating machines, brokering and managing machine-to-machine interactions (sessions) consistent with certain embodiments of the present invention is shown. At 1300 is a suite of trusted services (apps) that comprise the SAMI Platform for brokering and managing machine-to-machine interactions in a Zero Trust environment. In an embodiment, the SAMI Platform includes at least a machine identity registry, a secrets manager, an algorithm server, an authentication server, a session manager, a verify sidecar, pre-configured sidecars, and a web server. Most of these apps are managed by the SAMI Supervisor via their own sidecars, allowing any individual SAMI app or service to be replaced by a third-party app or service. For non-limiting example, the Secrets Manager may be replaced by HashiCorp's Vault. In an embodiment, the Sidecar's communication function performs much like an API's function to standardize inputs/outputs to provide a modular and interchangeable platform architecture.

The SAMI Platform operates continuously with high reliability and low latency, and securely manages machine identities, secrets, authorization, and authentication, using the CHIPS™ protocol. In an embodiment, the Machines Registry may serve as a database of machine identities and an identity alias manager; it registers machines and workloads and verifies their identity, maintains and updates a registry of machine identities, and updates machine identity aliases with each entry to a session ledger. In an embodiment, the Authorization Server may maintain a catalog of roles and permission profiles for different machine types; it receives new machine types, roles and permissions from the Business at machine registration, and updates machine types, roles and permissions per Business admin control.

In an embodiment. the Sidecars may be in an unconfigured state; at machine registration the machine's personalized CHIPS™ algorithm is embedded into Sidecar executable code prior to issuance of Sidecar to DevOps staff for installation in registered machines. The DevOps staff may test the machine installation to verify successful integration of issued Sidecars at time of machine registration. In an embodiment, the CHIPS™ Algorithm Server creates and issues CHIPS™ algorithms to Sidecars and provides the algorithm ID to the SAMI Secrets Manager. The Algorithm server also processes CHIPS™ algorithms, gets dynamic elements needed to build an ephemeral symmetric secret, and maintains a list of possible public source locations. In an embodiment, the Secrets Manager manages vaulting, logging, and manages machine alias ID-Algorithm ID pairs, as well as version histories of ephemeral symmetric keys.

In an embodiment, the Session Manager brokers workload sessions; it encrypts and decrypts and sends/receives messages, authenticates workloads, manages sessions and provides tokens to Sidecars, logs sessions, sends session ID and machine alias ID updates to the Machines Registry, audits session transaction logs, and issues any revocation command to shutdown Sidecars (and thereby "break glass" in an emergency). Any revocation command may include a sidecar and session re-boot function. In an embodiment, a Web Server may compose, publish and unpublish dynamic elements to public pages whose URL or URI is unique to a machine alias ID.

In an embodiment which eliminates the authentication server, successful decryption of an encrypted message using the ephemeral symmetric secret provides the equivalent function of authentication of the machine identity.

In an embodiment, Machine Identities are stored in the SAMI Machines Registry. A Machine Identity (Machine ID) is established once at registration of a machine (also referred to herein as a "workload" when in operation) and the Machine ID is associated with a Business and established by the authorized human administrator from the Business. In an embodiment, Machine Identities have permanence and uniqueness, and are listed in the Machines Registry and assigned a unique Machine ID. In an embodiment, these unique Machine IDs have a rotating machine alias ID in which the alias identity is a hash of the session ledger for the machine. At each session (brokered interaction with another machine) the session ID, date, time, and other parameters are logged in the session ledger. The log entry modifies the current alias, which may be a hash of the prior ledger entries, and the updated ledger is then hashed to create a new machine alias ID.

In an embodiment, each machine's session ledger is maintained by the Machines Registry. The machine alias is built at each session, encrypted and stored. The Machines Registry builds a machine alias and the respective workload Sidecar may also build its machine alias. In an embodiment, both aliases should be identical. If the two aliases do not match at the start of the next session, this state of affairs may be evidence of tampering.

In an embodiment, Machine alias IDs extend the initial trust established at registration through an identity chain with each new trusted session establishing a new link that is built on the authentication of the self-rotating ephemeral symmetric secret. In the case where a machine alias ID is presented by a Sidecar to the Session Manager as the machine identity credential for a new session, the Machine Identity and its aliases establish an identity network (web, mesh) of prior sessions of one machine to many others. The machine alias ID is retained by the Sidecar so that it can be used to begin authentication for the next session.

In an embodiment, the identity network and the session ledger build a pattern of use with workload identities over time, which is sufficient for analysis of anomalous events and unusual connections. In the case of identity network analysis, the analysis produces a risk score and offers an alert feature to notify administrators of potential security vulnerabilities.

In an embodiment, Machines and Workloads are registered under a business identity, and the Workloads inherit the domain certificate of the business. In the case where a Workload identity is compliant with the SPIFFE standard for SPVID and 'selectors,' the Machine Registry may issue a Sidecar to the Workload identity based on SPIFFE. The Sidecar and its Workload are a matched pair; the sidecar can only be used with that identity. The machine registration process includes steps taken by the Business/administrator to install the Sidecar in the Workload and trigger its operation from the Workload for the first session. The endpoint for the first session is a Verify Sidecar within the SAMI Platform that is specifically available to the Session Manager for testing the installation and operation of the installed Workload sidecar, confirming correct operation of the CHIPS™ algorithm, and initializing the protocol of interlocking the rotating machine identity with building the ephemeral symmetric secret.

In an embodiment, Machine Identities inherit default authorizations (permissions) of the registered business (unless altered by the business administrator) and may include other permission or constraint parameters. Machine Identities are assigned types such as, by way of non-limiting example, app, service, or container; Machine Identities are assigned roles such as, by way of non-limiting example, client, or server; and Machine Identities are assigned permissions (such as, by way of non-limiting example, read/write or date/time of operation).

In an embodiment, the Authorization Server defines and mediates the compatible types, roles, and permissions with other machine endpoints and session parameters. Machine permissions are established by an authorized business administrator at registration. Permissions may be updated by an authorized business administrator.

In an embodiment, the Algorithm Server creates CHIPS™ algorithms that are encoded in software and installed in Sidecars and assigned an Algorithm ID which is provided to the Secrets Manager when a machine is registered. The Algorithm Server maintains a list of publicly available locations of highly dynamic HTTP content that may be "scraped" (read by a machine) and the list may include current machine alias ID URLs of "machine part" pages published by the SAMI Web Server. CHIPS™ algorithms are encoded in software to scrape one or more public Internet locations whose content is dynamic. A running CHIPS™ algorithm also visits and scrapes a temporary URL location (as derived from the Machine Alias ID) to obtain a "machine part" of the algorithm associated with the specific Workload that requires authentication. Algorithm processing scrapes dynamic character strings Hidden In Plain Sight (HIPS) at multiple coordinate locations within the public location(s) described within the algorithm.

In an embodiment, each dynamic character string is a source part of an ephemeral symmetric secret, and at least five dynamic information parts may be required to improve entropy of the resulting secret. The instant innovation alters each string of dynamic characters obtained from the public locations to increase its entropy; alterations may include a variety of transformations, including, by way of a non-limiting example, adding characters, removing characters or replacing characters.

In an embodiment, the CHIPS™ algorithms define an assembly order of the algorithm parts, including one or more dynamic information string and the machine ID part. The CHIPS™ algorithms build a high-entropy string of characters for use as an ephemeral symmetric secret (symmetric encryption key).

In an embodiment, CHIPS™ algorithms include primary and secondary source locations of public locations to ensure that the loss of one or more public data sources may be tolerated without failing authentication of a Workload; the Algorithm Server maintains a log of server activities.

Figure 14:
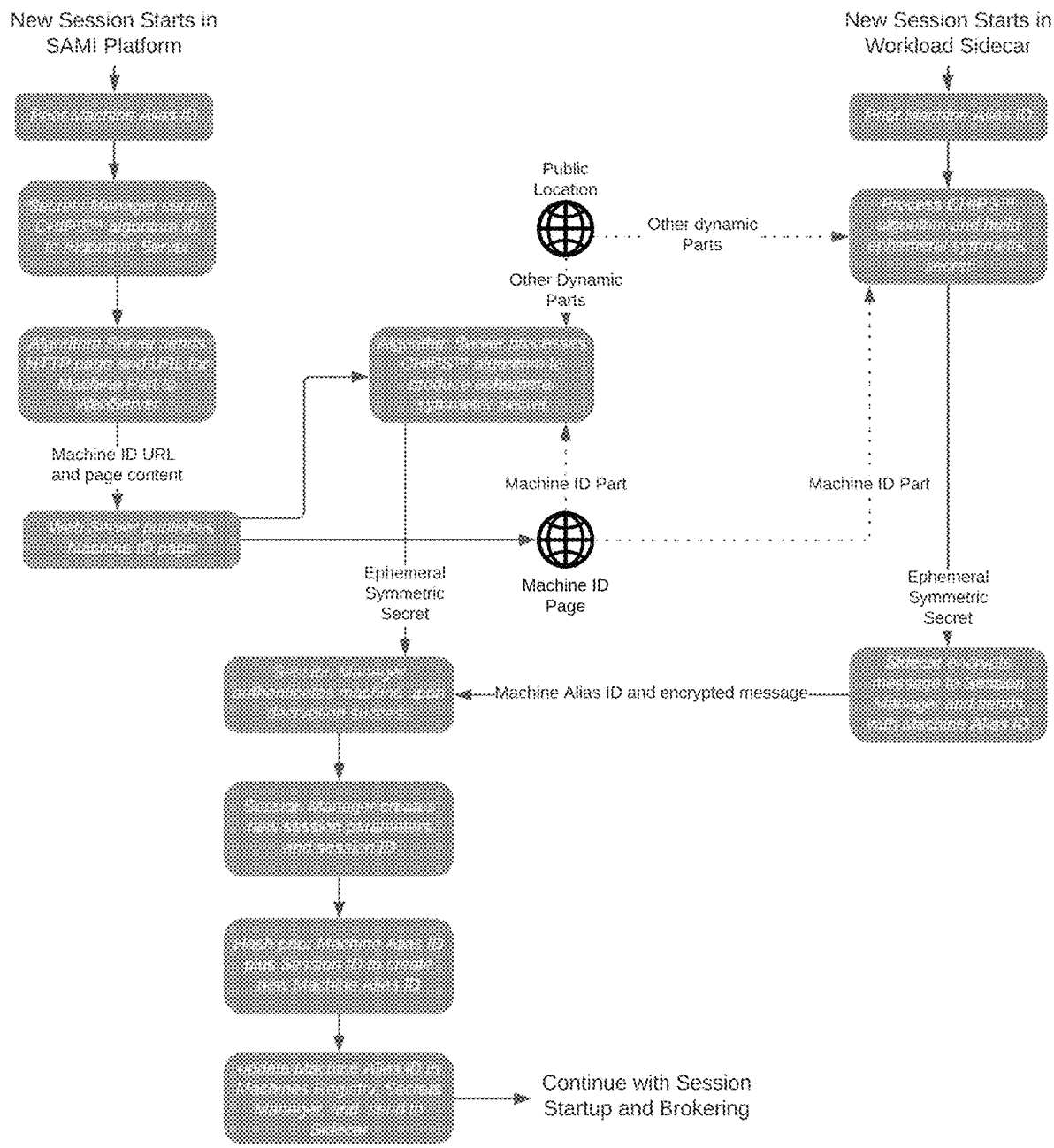
FIG. 14 illustrates the CHIPS™ protocol generating an identical ephemeral symmetric secret at two entities consistent with certain embodiments of the present invention.

Turning now to FIG. 14, a diagram illustrating the CHIPS™ protocol generating an identical ephemeral symmetric secret at two entities consistent with certain embodiments of the present invention is shown. At 1400 a Machine Identity Part replaces the fixed part of a PHS formula used by humans in the PHS human employment described elsewhere herein. In an embodiment, the CHIPS™ algorithm includes a Machine Identity Part obtained from a variable source HTTP location which is a derivative of the Machine Alias ID (the location changes dynamically with each session).

In an embodiment, the source URL and HTTP page are produced by the SAMI Web Server and the dynamic information presented on the Machine Identity page is generated by the Algorithm Server. The source variable (Machine Part) is found at coordinate locations on the Machine Identity page. Importantly, the CHIPS™ algorithm cannot produce a result without obtaining the source variable, which in an embodiment is the coordinate location of instantly-published HTTP content at the source URL. The source variable becomes an essential missing algorithm part that is the key to transforming the CHIPS™ algorithm from an inert state to a working state.

In an embodiment, the source variable is found at an HTTP URL that is a derivative of the Machine Identity, and the Machine Alias ID (constructed from the machine session ledger). The Machine Alias ID rotates at each session, and the Web Server publishes a web page of random dynamic content to a URL derived from the Machine Alias ID. The dynamic content at coordinate locations (specified by the CHIPS™ algorithm) on this page define the "machine part" of a CHIPS™ algorithm. In a non-limiting example, the Machine Identity page may be "hopr.co/Gkgoprt$pWigh?oirtke908tafye.html" where the character string "Gkgoprt$pWigh?oirtke908tafye" is the Machine Alias ID. In an embodiment, this HTTP page is not published by the Web Server until a session ID is issued. The HTTP page contains the source variable at a page coordinate location defined by the CHIPS™ algorithm, which becomes the Machine Part of the resulting ephemeral symmetric secret. Other algorithm parts may have different sources and algorithm parts coordinate locations. The web page for the Machine Part is only published during session brokering, remains published for a short time period, and then is unpublished.

In an embodiment, the PHS Web Server generates and publishes one or more HTTP web pages with dynamic "high entropy" content to augment the dynamic elements found at other public locations. The published dynamic content may increase the entropy of the resulting ephemeral symmetric secret; high entropy plain text strings of random characters may be published to multiple domain addresses and subdomains and page URLs.

In an embodiment, authentication of a Sidecar causes the Session Manager to create a Session ID from various session parameters, such as, by way of a non-limiting example, the date, time, and client and server machine IDs. The session ID is logged in the session ledger causing the rotation to a new machine alias ID.

Figure 15:
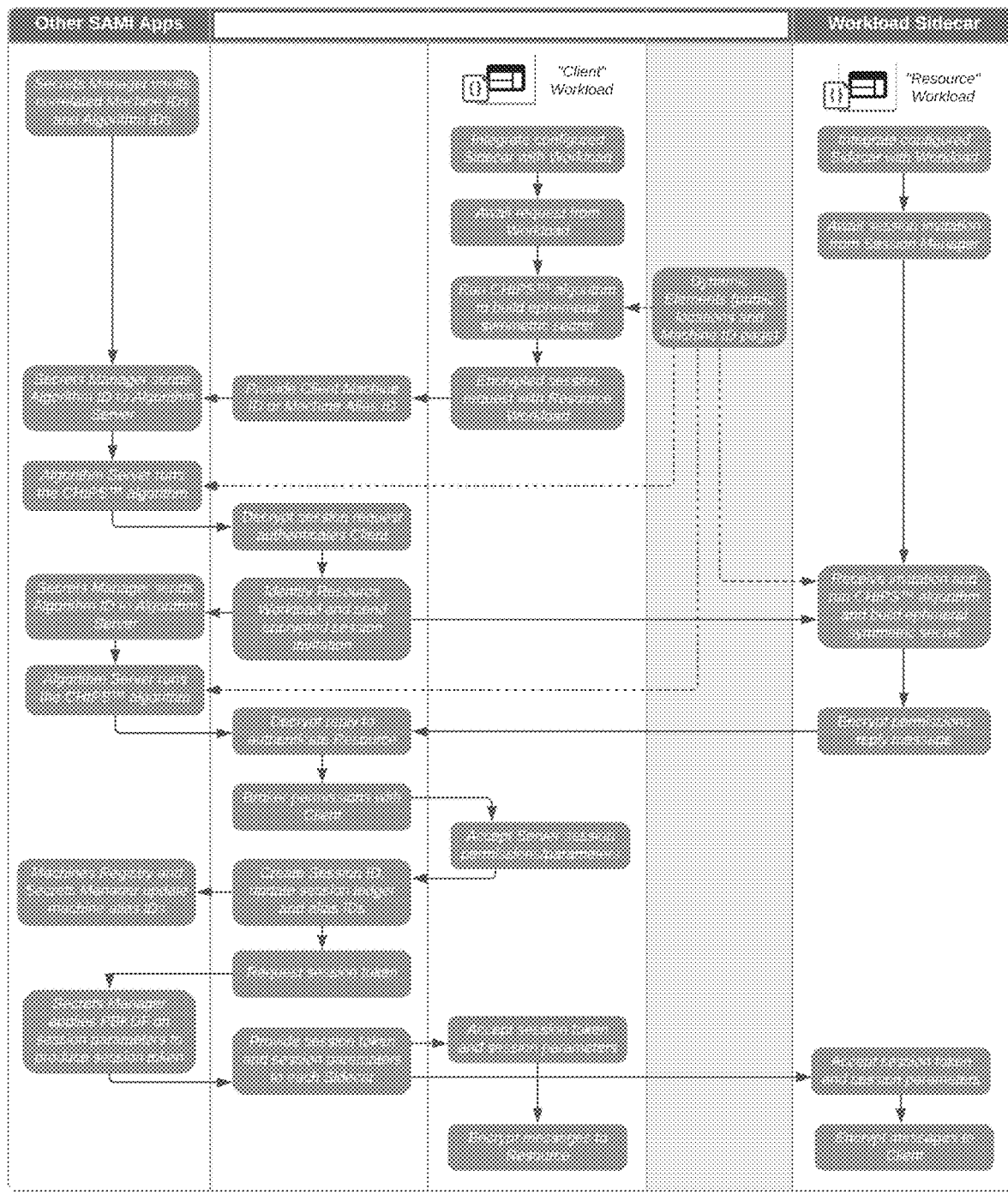
FIG. 15 illustrates the general SAMI "zero trust" operation of two workloads independently authenticating to the SAMI Platform consistent with certain embodiments of the present invention.

Turning now to FIG. 15, diagram illustrating the general SAMI "zero trust" operation of two workloads independently authenticating to the SAMI Platform consistent with certain embodiments of the present invention is shown. The process establishes trust with the SAMI Platform and then extends that trust to ephemeral interactions between workloads for the limited time of a session. At 1500, the Secrets Manager obtains, encrypts, and stores correlated IDs for the Machine ID and Machine Alias ID (from the Machines Registry), and Algorithm IDs (from the Algorithm Server). When the Session Manager provides a Machine ID or machine alias ID, the Secrets Manager identifies the matching CHIPS™ algorithm ID for the Workload and provides the algorithm ID to the Algorithm Server In an embodiment, the Algorithm Server uses the CHIPS™ algorithm ID to locate the encoded CHIPS™ algorithm within its library and processes the code (runs the algorithm) to create the authentic ephemeral symmetric secret.

In an embodiment, on request of the Session Manager, the Secrets Manager may create a session token for use as an encryption key by applying a Password-Based Key Derivation Function (PBKDF) to a combination of session parameters such as, by way of non-limiting example, the Session ID, Machine Alias ID, and date and time. The Secrets Manager logs each ID request or key produced.

In an embodiment, a "Sidecar" is code that is "plug and play" and installed on a host machine running a Workload. A Sidecar manages communications to/from the Workload and replaces the traditional static key that would be written in code to authenticate to an external function such as an API call. Each Sidecar is pre-configured with a personalized CHIPS™ algorithm by the Algorithm Server, and issued to a Workload by the SAMI Machines Registry at registration.

In an embodiment, each Sidecar is assigned a Sidecar ID when it is issued to a machine at registration; the Sidecar ID is used for logging. Each configured Sidecar includes the CHIPS™ logic, process, and security functions so that its installation by DevOps teams may occur with the least amount of manual configuration. The installed Sidecar may only be used by and interoperate with its host workload and communicate with the SAMI Session Manager and other trusted Sidecars.

In an embodiment, the operation of a Sidecar is triggered by its Workload or by the SAMI Session Manager. In the first case it may be a 'client' workload requesting a connection to another workload (the resource). In the second case, another registered 'client' workload may be attempting to connect with and obtain a resource, and the initial trigger message is from the SAMI Session Manager. In most embodiments, Sidecars operate for the duration of a session and then must be re-triggered for a new session. A Sidecar may perform the same functions of several SAMI Platform apps, but while acting as a smaller "lightweight" application. Sidecars may store ephemeral symmetric keys and session tokens, Session IDs, and session parameters in volatile memory; in such case all stored sensitive data exist for the session lifetime only.

In an embodiment, a Sidecar communicates with its Workload, with other trusted Sidecars, and with the SAMI Session Manager only. Such communications are sent and received, and encrypted and decrypted by the Sidecar without reliance on Transport Layer Security. A Sidecar manages workload session tokens and timing, expiration, and renewal, and may, once a session has been brokered, operate with multiple external workloads that are interacting with its host workload. Each Sidecar runs on the machine that its workload operates on. Each such Sidecar is integrated with the workload because the Sidecar was installed into the workload at registration.

In an embodiment, when the workload starts, the Sidecar scrapes (reads) HTTP data from the public locations to use with its CHIPS™ algorithm and builds the ephemeral symmetric secret to pass to the Session Manager for authentication. A First Sidecar operating on behalf of a client workload requesting resources from another workload receives the resource workload's session rules from the Session Manager and decrypts the message with its ephemeral symmetric secret. A Second Sidecar operating on behalf of a resource owner receives a Session Manager message and decrypts it with its ephemeral symmetric secret. In an embodiment, the message is a connection request that includes the workload identity and the resources needed and time required. The Second Sidecar passes the message data to its Workload and awaits the Workload reply, which may include session parameters or acceptance criteria. The Second Sidecar encrypts the workload reply (using its ephemeral symmetric secret) and sends the ciphertext message to the Session Manager. The Session Manager decrypts the message from the Second Sidecar and re-encrypts the message with the First Sidecar's ephemeral symmetric secret and then sends the ciphertext message to the First Sidecar.

In an embodiment, the Session Manager's successful decryption of messages encrypted with ephemeral symmetric secrets from an identity serve to authenticate the identity. Once authenticated, a Sidecar receives a session token to use as a session encryption key inside an encrypted message (which is encrypted with the Sidecar's ephemeral symmetric secret) from the Session Manager. The Session token is built from encrypted session parameters such as but not limited to, date, time, session time limit, Workload endpoints, and session ID. A Sidecar may use its session token (symmetric key) to encrypt messages and securely communicate directly with the sidecar of the respective workload in the session.

In an embodiment, each authenticated Sidecar decrypts received messages from the other authenticated Sidecar in the session, verifies the parameters, and passes the workload-specific data to their workload; the Sidecars each monitor session time and alert their respective workload as the session expiration time approaches. A client Workload may request session extension through its Sidecar, to the Session Manager, and then to the resource Sidecar.

In an embodiment, the workload triggers its Sidecar when an interaction with another workload is required, such as, by way of non-limiting example, during an API call from one workload to obtain or send data to another workload. The requesting (initiating) workload identifies the other workload endpoint and determines the requested services. The requesting workload does not know the machine alias of the other workload and must use the machine identity that was supplied by the Business administrator at registration.

In an embodiment, the Sidecar builds the ephemeral symmetric secret from its CHIPS™ algorithm by scraping the Source(s) for dynamic elements and the machine part. The Sidecar encrypts a standard connection request using its ephemeral symmetric secret as the encryption key, and sends the Session Manager a message containing the machine alias ID and the encrypted connection request (two ciphertext strings). The machine alias ID (a derivative of the session ledger) is rotated by both the Sidecar and the Session Manager.

In an embodiment, the Session Manager receives the message and provides the machine alias ID to the Secrets Manager. The Secrets Manager unseals its vault and locates the Algorithm ID that matches the machine alias ID. It sends the Algorithm ID to the Algorithm Server. The Algorithm Server obtains and processes the CHIPS™ algorithm to build the ephemeral symmetric secret, and sends this secret to the Session Manager. The Session Manager decrypts the message contents. Successful decryption of the encrypted Sidecar message serves to authenticate the Sidecar (and workload).

In an embodiment, the Session Manager authenticates machines (via their sidecars), brokers workload sessions, manages secure messaging between the SAMI Platform apps and between the Platform and the various workload Sidecars, delivers and manages session tokens (controls and synchronizes session tokens to ensure machine operations are not interrupted) and logs session data. During Session Brokering, and after the session request by a Client Sidecar, the Session Manager may compose a message to the Resource Sidecar requesting a session with the client workload; the message contents are derived from the Client Sidecar session request message. The Session Manager requests the Machines Registry provide the Resource's machine alias ID to the Secrets Manager. The Secrets Manager unseals its vault and locates the matching Algorithm ID and provides the ID to the Algorithm Server. The Algorithm Server locates the CHIPS™ algorithm and builds the ephemeral symmetric secret. The Algorithm Server provides the secret to the Session Manager and it is used to encrypt a session invitation message to the Resource Sidecar. The Session Manager sends the Resource Sidecar the encrypted session invitation message as two ciphertext strings: the Resource alias ID and the encrypted session invitation message.

In an embodiment, the Resource Sidecar recognizes its own alias ID and processes its CHIPS™ algorithm to build its ephemeral symmetric secret and decrypts the session invitation message. The Resource Sidecar passes the message contents to the Resource Workload and awaits a response, which may include session parameters and permissions and constraints based on policies (which the Client must accept to establish a session). Permissions policies are set by the Resource workload at each session. The Client workload may or may not be known to the Resource workload and restrictive permissions consistent with low trust may be necessary. If already known and trusted by the Resource workload through a series of sessions and session transactions recorded in the Sidecar's session ledger, then the session parameters may be less restrictive.

In an embodiment, the Resource Sidecar replies to the Session Manager with its new alias ID and an encrypted session permissions message (encrypted using the Resource ephemeral symmetric secret). The Session Manager receives and decrypts the Resource Sidecar message and builds a session parameters message to send to the Client Sidecar. The session parameters message is encrypted with the Client ephemeral symmetric secret and sent to the Client Sidecar with the Client machine alias ID in two ciphertext strings: the Client alias ID and the encrypted message.

In an embodiment, the Client Sidecar receives the message, recognizes its alias ID, and uses its ephemeral encryption key to decrypt the session parameters message and passes the session parameters to the Client Workload for confirmation. If the Client workload accepts, the Sidecar confirms acceptance to the Session Manager with a confirmation message, but if the Client workload rejects the session conditions, the Session Manager notifies the Resource Sidecar and closes the session. If there is no response from the Client Sidecar (i.e., no response from its workload) the Session Manager completes session brokering under a caution condition and reduces the client session parameters (such as, by way of non-limiting example, a constrained session time period used for the session token).

In an embodiment, the Session Manager manages the duration and messaging parameters of sessions through session tokens that it simultaneously issues to sidecars (Workloads) once they are authenticated. The Session Manager builds a session token from session parameters (such as, by way of non-limiting example, date, time, session ID, session lifetime, and workload IDs). The Session Manager sends the session token to the Client and Resource Sidecars at the same time ensuring synchronization of the encryption key used for secure messaging between the two Workload endpoints. The session token is sent to each Sidecar in an encrypted token message using the respective Workload ephemeral symmetric secret; the token message contains session parameters such as, by way of non-limiting example, the token, the session time limits, and alias ID of the other workload.

In an embodiment, the Session Manager may revoke session tokens when the session expires or when certain error conditions occur; session tokens are stored only in RAM and not stored in permanent memory. Session tokens are lost when the session is closed.

In an embodiment, once a session has been brokered, the Sidecars manage communication between their workloads. Sidecars communicate with their respective workloads to transfer requests and resources as appropriate. Sessions are logged (including information such as, by way of non-limiting example, workloads involved, start date time, and duration) by the Session Manager. The Session Manager passes each session's details to the Machines Registry to be included in the machines' session ledger and the SAMI logs. The machine session ledger is re-hashed each time a Session ID is added to the ledger and a new machine alias ID is created.

Figure 16:
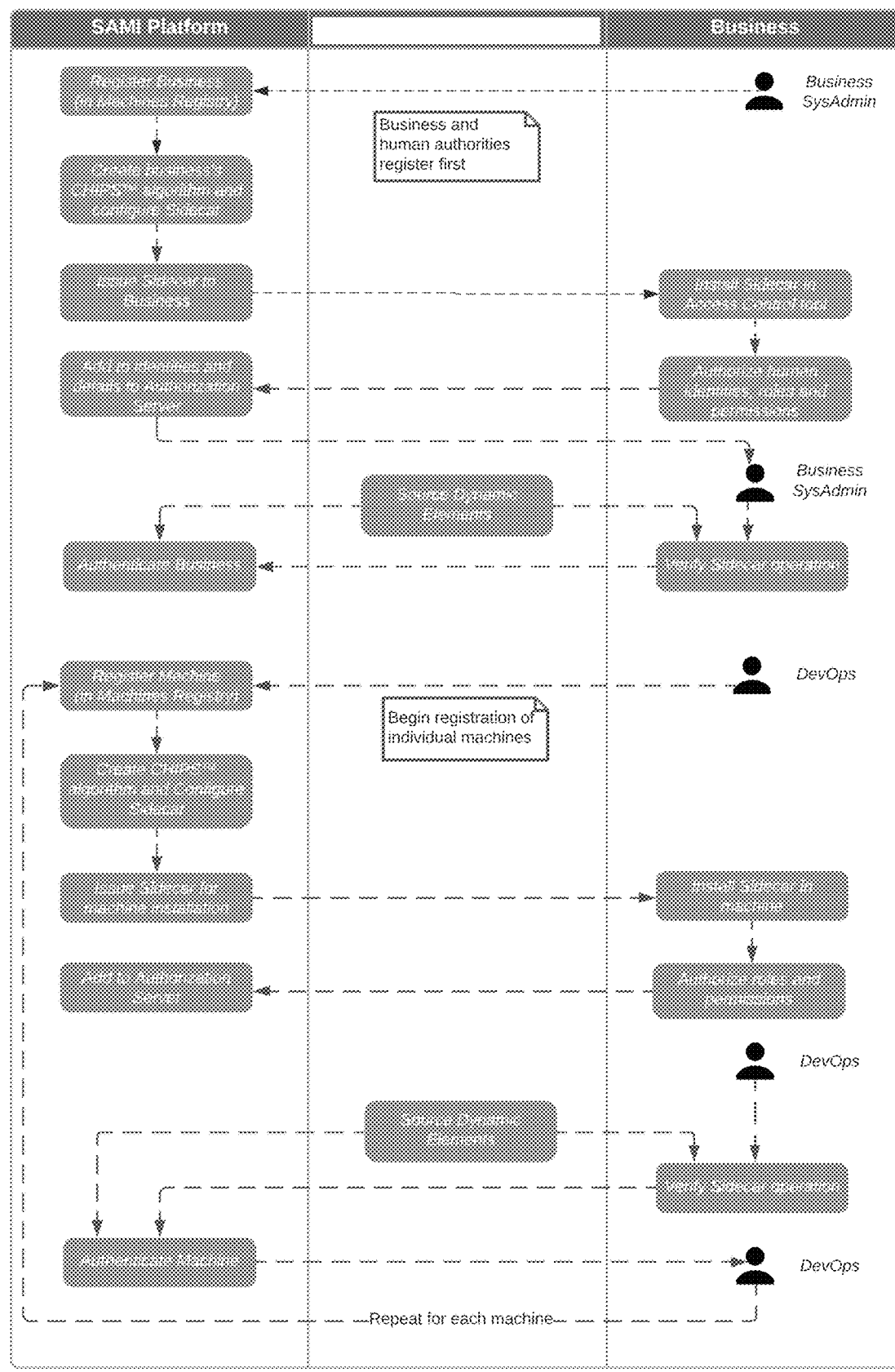
FIG. 16 is a state diagram illustrating a SAMI Business Registration Process consistent with certain embodiments of the present invention.

Turning now to FIG. 16, a state diagram illustrating a SAMI Business Registration Process consistent with certain embodiments of the present invention is shown. At 1600, the sequence and characteristics of the CHIPS™ protocol and SAMI Platform spans various machine types and use cases; applications interacting through APIs involving two-way machine communication is shown. In an embodiment, two applications, a client and a resource server, belong to the same business (Business A) and must interoperate in a Zero Trust cloud environment. The client and server machines may also reside within separate public clouds such as, by way of non-limiting example, AWS, GCP, and/or Azure. The process for two API endpoints that may exist at two different businesses is equivalent.

In an embodiment, a business registers with the hopr Machines Registry of the instant innovation. The identity of the business is confirmed by its domain. One non-limiting example of domain confirmation includes providing proof of a valid X.509 certificate employing TLS encryption. A unique SAMI business identity (BID) is assigned and entered in the Machines Registry. Although the registrant in this use case is a business identity, a human administrator initiates and performs business registration. The human administrator's credentials are the true "secret zero" that anchors the chain of CHIPS™ algorithms for a business and its machines.

In an embodiment, the Algorithm Server creates a sophisticated algorithm (the CHIPS™ algorithm) for the Business and encrypts and stores the algorithm in the Algorithm Server and sends the Algorithm ID and the BID to the Secrets Manager for secure storage in an encrypted vault. In an embodiment, this algorithm establishes the Business's access control secret, its Secret Zero. The CHIPS™ algorithm is static but may be modified if necessary and includes a missing variable that is only knowable by an authorized user; this prevents its unauthorized use. The Algorithm Server places the CHIPS™ algorithm as code in a Sidecar that is provided to the business (via TLS) at the time of registration.

In an embodiment, the Business's authorized administrator obtains the Sidecar (such as, in a nonlimiting example, retrieving a Docker image from a private image repository) and installs the Sidecar in its privileged access tool; the Sidecar is accessed and triggered by the Business administrator when needed to perform a function such as, by way of non-limiting example, adding machines to the business account. Sidecar IDs and Machine IDs are included in the Machines Registry. The business administrator registers the default machine types, roles, and permissions in the SAMI Authorization Server In an embodiment, subsequently, a business DevOps person may register machines and obtain configured Sidecars (encoded with a machine-specific CHIPS™ algorithm) and integrates the Sidecar with its machine host. The DevOps person tests and verifies the function of the Sidecar to ensure that it operates correctly. The SAMI Platform of the instant innovation provides an internal "Verify Sidecar" to interact with the Business and machine Sidecars during test and verification. For security reasons, all steps taken to registering a business identity must be completed in one authenticated human session. In an embodiment, once the business is registered, a DevOps person is able to register any of the business's machines and workloads such as, but not limited to, apps and APIs.

In an embodiment, a machine's CHIPS™ algorithm is created by employing the Algorithm Server to create a sophisticated algorithm based on, by way of non-limiting example, a list of public HTTP locations with dynamic content, coordinates for character string locations on the HTTP page, alterations or modifications to the character strings found at the coordinate locations, and instructions on how to assemble the character strings. The Algorithm Server encodes the algorithm as software, assigns it an Algorithm ID and stores it. It provides a copy of the encoded algorithm to the Sidecar during configuration phase of machine registration. The configured Sidecar is provided to the DevOps person for integration with the machine (via TLS) at the time of registration. The DevOps person integrates the Sidecar in with the machine workload; the Sidecar runs with the workload. The DevOps person registers the default machine types, roles, and permissions in the SAMI Authorization Server and tests and verifies the function of the Sidecar to ensure that it operates correctly. The SAMI Platform of the instant innovation provides an internal Verify Sidecar to interact with the workload Sidecar during verification.

In an embodiment, upon initial installation of a Sidecar with its Workload, the DevOps person manually triggers the Sidecar to connect to the Session Manager of the instant innovation for its first session with the Verify Sidecar. The Verify Sidecar is a unique version of a sidecar that is automatically trusted and authenticated by the Session Manager. The installed workload Sidecar scrapes the Source(s) for dynamic elements and then builds the ephemeral symmetric secret. The Sidecar sends the Session Manager its Machine ID and a test message encrypted with its ephemeral symmetric secret. In an embodiment, successful decryption establishes the first Session ID and session ledger record for the installed Sidecar (workload) which initiates rotation of the machine alias ID by both the Sidecar and the Session Manager. In an embodiment, the Verify Sidecar is only used to confirm successful Sidecar installation and operation with a workload and to initiate the interlocking rotation of the machine alias ID with the construction of the ephemeral symmetric secret.

The process for machine registration is repeated for each workload across the business.

Figure 17:
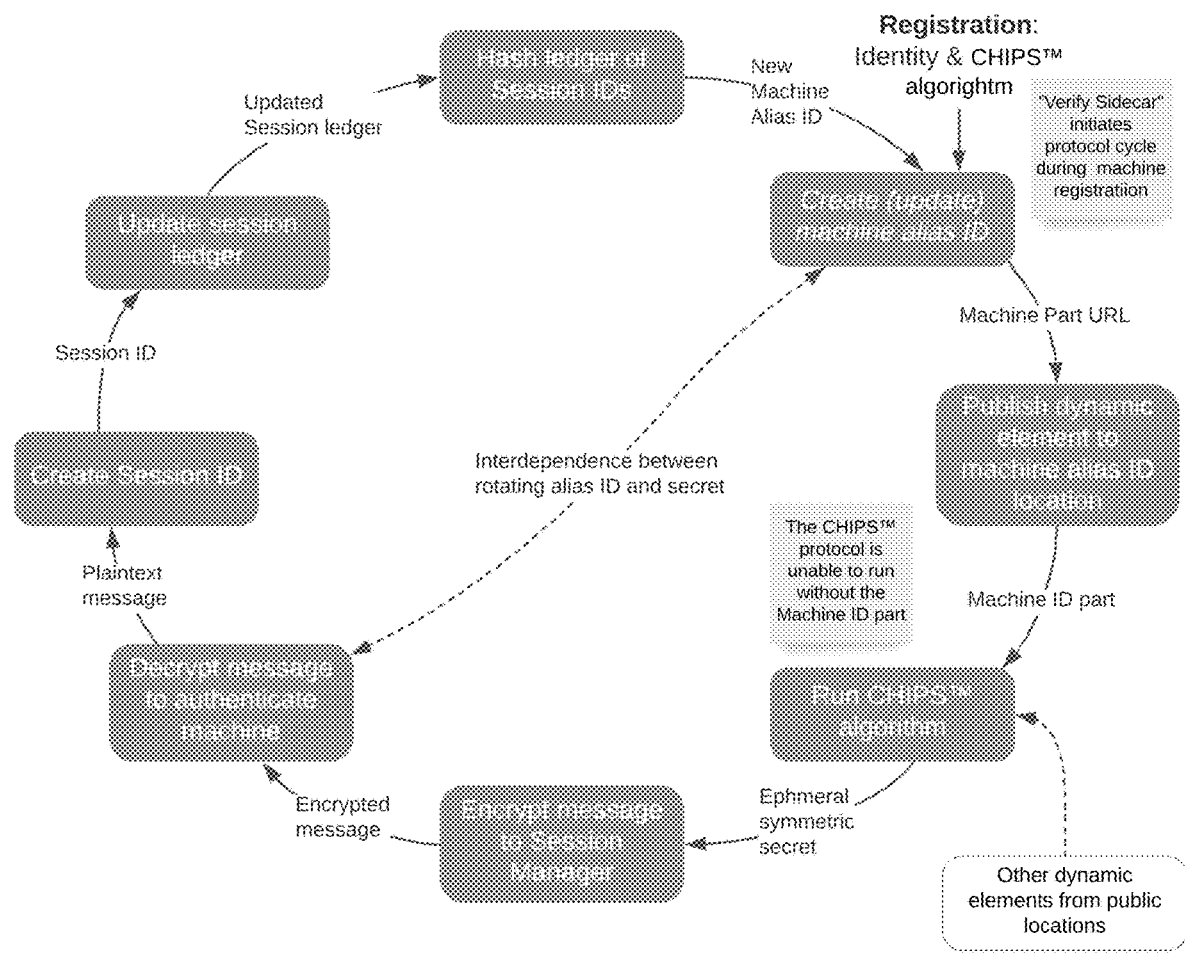
FIG. 17 is a process diagram illustrating the protocol for SAMI Identity and Secret Dynamic Coupling consistent with certain embodiments of the present invention.

Turning now to FIG. 17, a process diagram illustrating the protocol for SAMI Identity and Secret Dynamic Coupling consistent with certain embodiments of the present invention is shown. At 1700, an Identity-Secret Coupling protocol establishes an immutable interdependence between a machine's rotating identity credential and its rotating key credential (the ephemeral symmetric secret) as they rotate from session to session. A machine identity alias (machine alias ID) is derived from the machine's session history, as captured in a ledger of sessions of the machine. In an embodiment, the machine alias ID (or a derivative thereof) defines a public HTTP location (URL or URI) where unique dynamic information is published and independently knowable and available to both the SAMI Session Manager and the specific workload Sidecar whose machine alias ID matches the URL. The URL is ephemeral and the dynamic content at that location provides a "machine part" essential to the successful processing of the CHIPS™ algorithm. An encoded CHIPS™ algorithm (such as in the Algorithm Server or a Sidecar) cannot run successfully until the dynamic information for the Machine ID part is published by the SAMI Web Server and the SAMI Web Server cannot publish a page unless it knows the current Machine Alias ID. When the encoded CHIPS™ algorithm is processed, it creates the ephemeral symmetric secret needed to start a machine-to-machine session. Successful authentication produces a new session ID, which is added to the hash of the current session ledger, and then re-hashed and a new machine alias ID is produced; the cycle repeats itself for each session.

Figure 18:
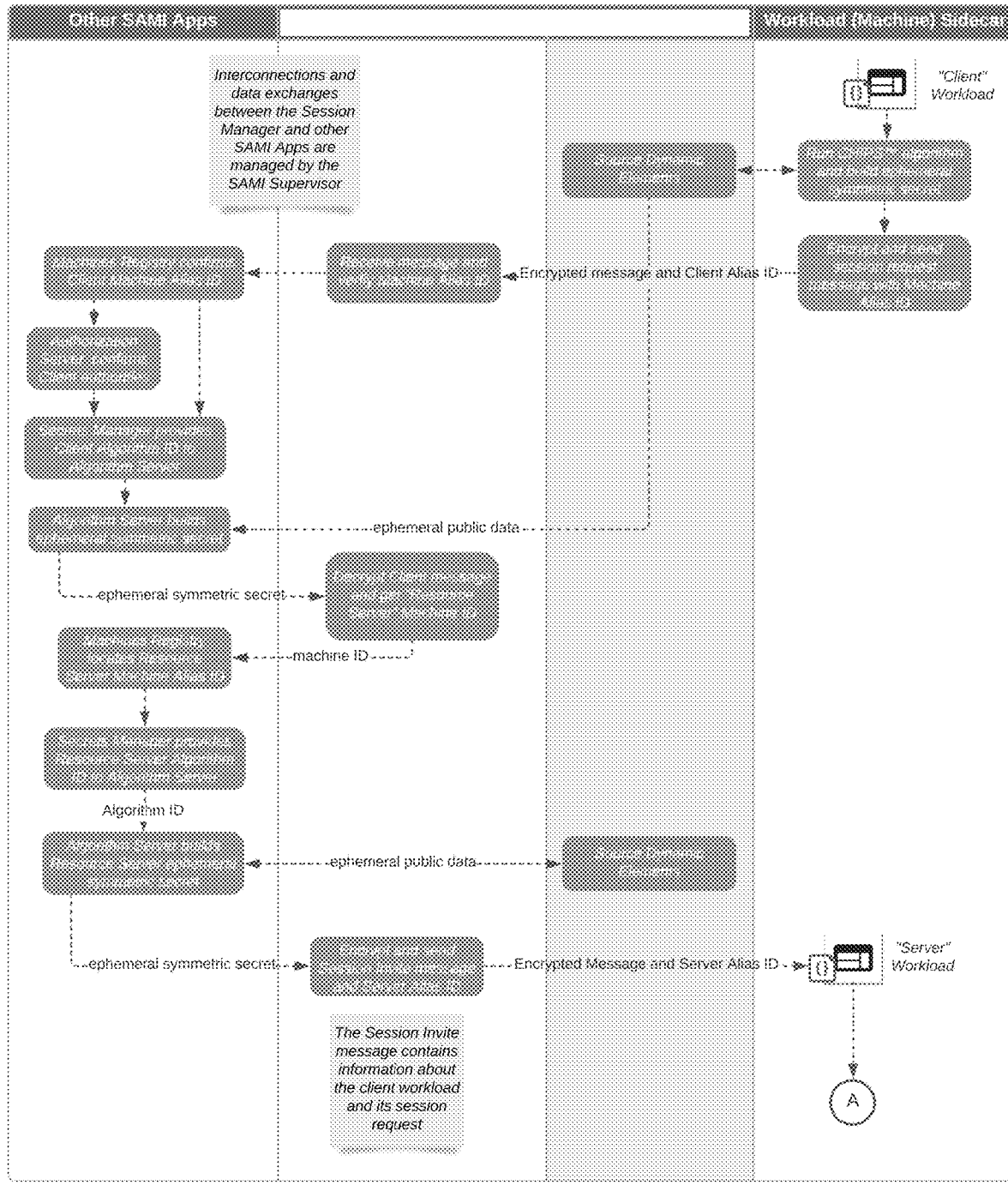
FIG. 18 is a state diagram illustrating SAMI Machine Session Startup consistent with certain embodiments of the present invention.

Turning now to FIG. 18, a state diagram illustrating SAMI Machine Session Startup consistent with certain embodiments of the present invention is shown. At 1800, a session typically begins with action from an application (Client) that needs data or services from an external resource (Server). In an embodiment, upon receipt of an encrypted message from a "client" Sidecar, the SAMI Session Manager initiates session startup. The interactions and connections between the SAMI Session Manager and the other SAMI Platform apps in this process are managed by the SAMI Supervisor. This Supervisor's control and management arrangement with the SAMI Platform is the recursive feature of the SAMI architecture; the Supervisor performs similar functions of the Platform, but only for the apps and services of the Platform.

In an embodiment, the client workload triggers its Sidecar when it requires data or resources from another app or service, such as, by way of a non-limiting example, accessing its API to get data. The Sidecar runs (processes) its CHIPS™ algorithm and visits the public location(s) to obtain the required dynamic data. It also visits the machine alias ID page to get the machine part and then builds the ephemeral symmetric secret according to the algorithm. The Sidecar forms a session request message defining the Workload's request and encrypts the message with its ephemeral symmetric secret. The Sidecar retrieves its machine alias ID and sends the Session Manager the encrypted message with its machine alias ID. The Session Manager receives the message and confirms the Machine Alias ID with the Machines Registry.

In an embodiment, a confirmed machine identity causes the Secrets Manager to retrieve the CHIPS™ algorithm ID for the client workload and provide it to the Algorithm Server. The Algorithm Server locates the correct algorithm and processes it to get the dynamic elements and, separately, the Machine ID part, to build the client ephemeral symmetric secret. The Algorithm Server sends the client ephemeral symmetric secret and confirmed machine alias ID to the Session Manager, enabling the Session Manager to decrypt the initial Client Sidecar message. Successful message decryption authenticates the Client workload such that no other authentication is needed.

In an embodiment, the plaintext (decrypted) client session request message reveals the "server" workload identity. The Session Manager sends the server workload identity to the Machines Registry to obtain the current machine alias ID. The Machines Registry confirms the server identity and sends the machine alias ID to the Secrets Manager, which uses the Machine Alias ID to locate the server's CHIPS™ algorithm ID and provide the ID to the Algorithm Server. The Algorithm Server locates the correct CHIPS™ algorithm and visits the public location(s) and machine part URL to obtain the required dynamic data, then builds the server's ephemeral symmetric secret. The Algorithm Server passes the Machine Alias ID and server ephemeral symmetric secret to the Session Manager, which prepares a "session invite" message to the Server Sidecar. The message includes details of the client and its request and is encrypted with the server ephemeral symmetric secret. The Session Manager sends the encrypted session invite message along with the server machine alias ID to the Server Sidecar.

Figure 19:
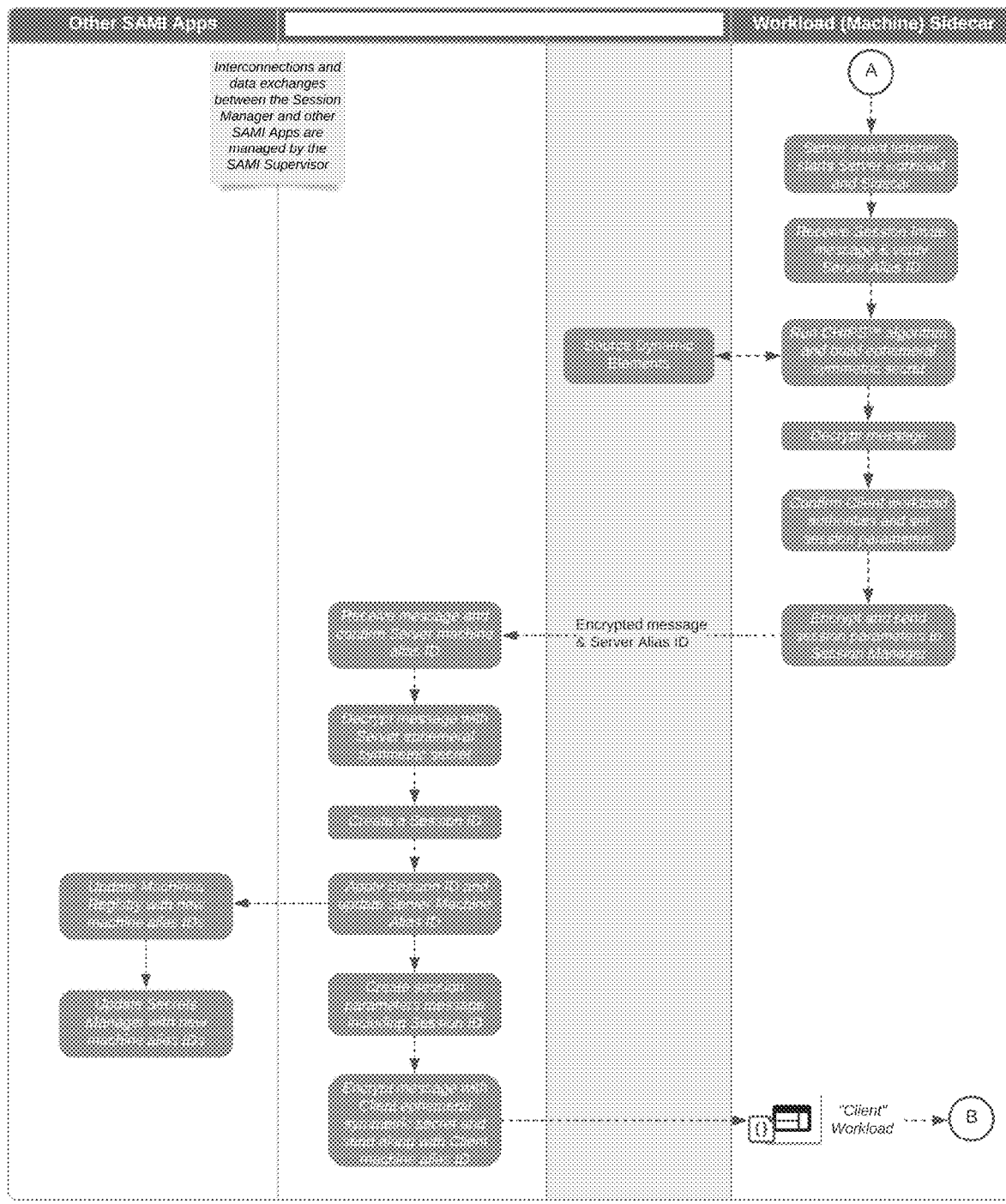
FIG. 19 is a first state diagram illustrating SAMI Machine Session Brokering consistent with certain embodiments of the present invention.
Figure 20:
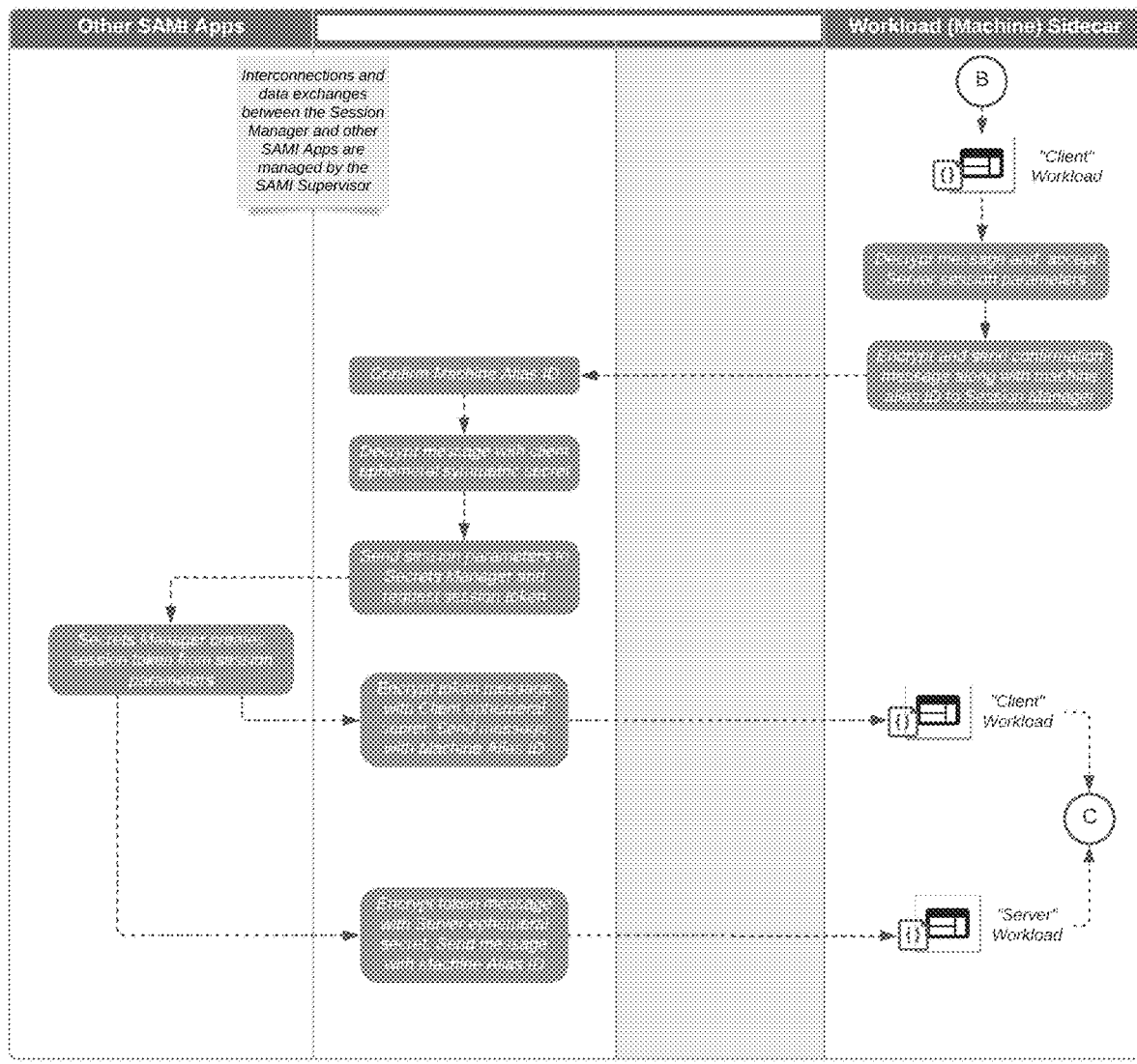
FIG. 20 is a second state diagram illustrating SAMI Machine Session Brokering consistent with certain embodiments of the present invention.

Turning now to FIGS. 19 and 20, a first and second state diagram illustrating SAMI Machine Session Brokering consistent with certain embodiments of the present invention are shown. At 1900 the next phase of a session brokering involves brokering with the "server" workload to establish the session parameters and permissions for the Client and to pass them to the Client for confirmation. At 2000 the Client receives and confirms the Servers session parameters and the Session Manager simultaneously provides session tokens to each workload. Each Sidecar receives encrypted messages along with its Machine Alias ID from the Session Manager and must use its ephemeral symmetric secret to decrypt them. The session token is the key with which each Sidecar encrypts the messages (transactions of requests and data) to the other Sidecar in the session once brokering is completed and the session is underway.

In an embodiment, the Server Sidecar runs its CHIPS™ algorithm and scrapes the dynamic elements (including the machine part) from the public locations and builds its ephemeral symmetric secret. The Server Sidecar decrypts the session invite message from the Session Manager to learn the Client workload identity and request. The Server Sidecar confirms the Client workload's identity and its authorizations are within its claims. It then sets session permissions such as, but not limited to, duration, allowed requests, data limits, service levels (such as, by way of non-limiting example, response time or priority), and possibly transaction charges (for metered services). The Server Sidecar sends a session permission message to the Session Manager (encrypted with its ephemeral symmetric secret) which contains the session permissions along with its machine alias ID.

In an embodiment, the Session Manager receives the Server Sidecar's session permissions message, verifies the machine alias ID, and decrypts the message with the Server Sidecar ephemeral symmetric secret. The Session Manager builds and sends a new encrypted 'session parameters' message to the Client Sidecar containing the session parameters and encrypts it with the Client Sidecar ephemeral symmetric secret. The Client Sidecar receives and decrypts the message and confirms the session parameters with a reply message, the confirmation message, to the Session manager.

In an embodiment, once the Client Sidecar confirms the session permissions, session brokering ends with the Session Manager simultaneously sending both sidecars an encrypted message (encrypted with their respective ephemeral symmetric secrets) containing a Session Token. The Session Token is an ephemeral key used by each Sidecar to encrypt messages between them such as, but not limited to, API requests and response messages, data requests and data replies. Each message is accompanied by the respective Machine Alias ID for the Client and Server workloads for the duration of the session.

Figure 21:
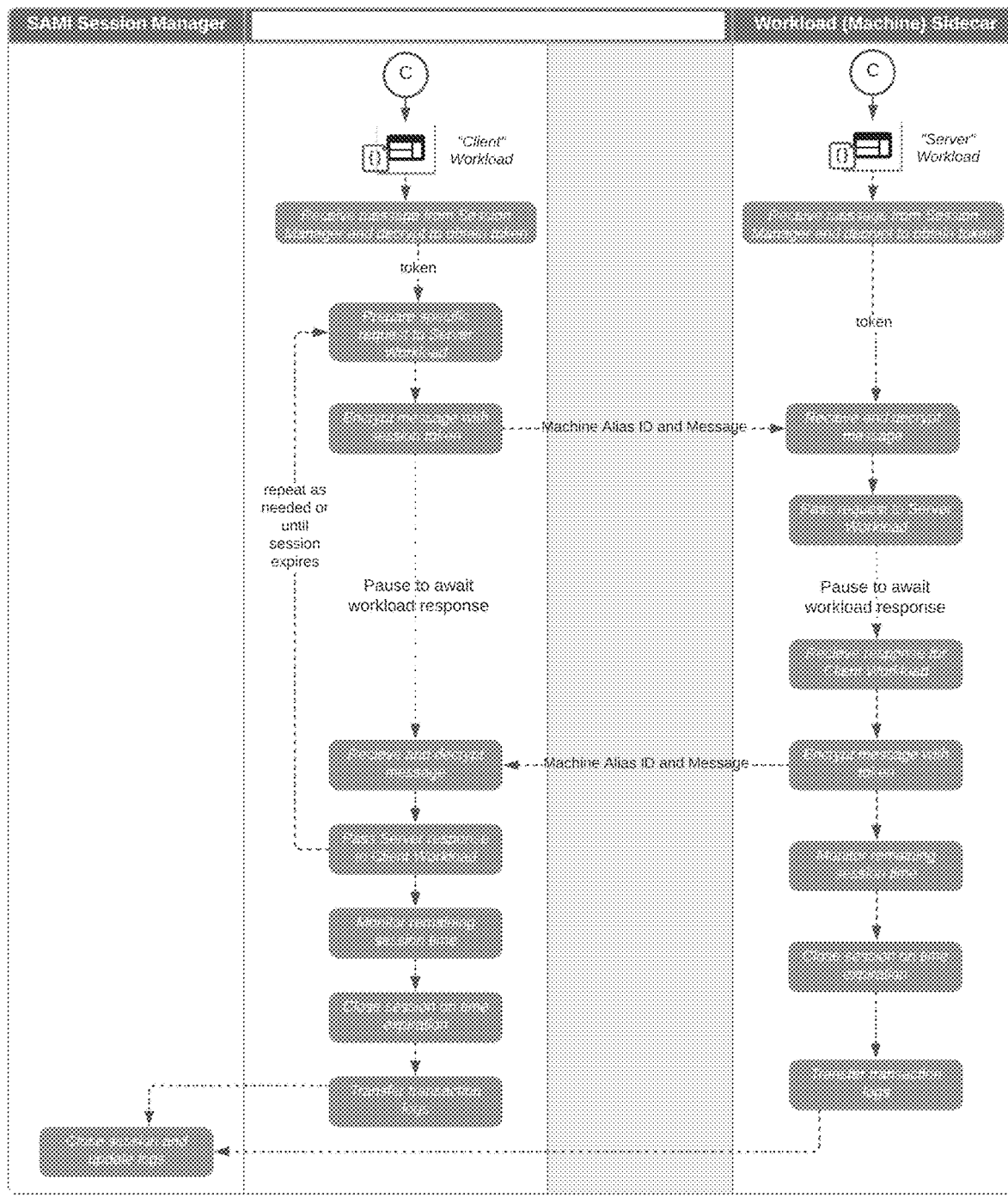
FIG. 21 is a state diagram illustrating SAMI Session Operations consistent with certain embodiments of the present invention.

Turning now to FIG. 21, a state diagram illustrating SAMI Session Operations consistent with certain embodiments of the present invention is shown. At 2100, once the Session Manager issues the session token to the two Sidecars, trust between the two workloads is established and the session moves to direct interaction between the two Sidecars. The Sidecars monitor session transactions and log each transaction/message and monitor session expiration time. A Sidecar may extend session time upon Resource workload request; Sidecars close the session and erase (destroy) the token when session time has expired.

In an embodiment, Sidecars pass the encrypted transaction log to the Session Manager at close of the session. The transaction logs are encrypted with the Session ID and communicated to the Session Manager at the end of each session. The Session Manager creates session patterns from the transaction logs (by way of non-limiting example, request or response, type of transaction, order of transactions) for use in future sessions as an anomaly detection template. The transaction logs may include send or receive, date-time, type of request (by way of non-limiting example, POST and PUT) and Sidecar ID.

While certain illustrative embodiments have been described, it is evident that many alternatives, modifications, permutations and variations will become apparent to those skilled in the art in light of the foregoing descriptions.

What is claimed is:

1. A platform for secure communications, comprising:
   a Secrets, Authentication, and Machine Identity (SAMI) server having a data processor; said SAMI server receiving an encrypted session request message having a client message; said SAMI server receiving a machine dynamic data element for at least one particular machine and at least one dynamic ephemeral public data element where said ephemeral public data element is a data element taken from a public data source location, and a client machine alias identifier associated with said at least one particular machine; said SAMI server confirming said machine alias identifier and providing said machine alias identifier to a Codes Hidden In Plain Sight (CHIPS) module; said SAMI server instantiating said CHIPS module to create an ephemeral symmetric secret where said ephemeral symmetric secret is a symmetric encryption key built each time a session begins; said SAMI server decrypting said client message utilizing said ephemeral symmetric secret to authenticate said machine alias identifier; said SAMI server encrypting a message with said ephemeral symmetric secret at the beginning of each data transmission session to optimize data transmission security; said SAMI server transmitting said session request message utilizing said optimized data transmission security.

2. The platform of claim 1, where said ephemeral public data element comprises an ephemeral symmetric secret comprising said machine dynamic data element and at least one ephemeral public data element.

3. The system of claim 2, where a machine identity associated with a particular machine or device is provided a machine alias identifier and said machine alias identifier is provided to said CHIPS module.

4. The system of claim 1, where each of said ephemeral public data components are created utilizing at least one public data source identified by a user for use in constructing a fixed character string.

5. The system of claim 1 further comprising utilizing said CHIPS module to encrypt said client message.

6. The system of claim 5, where said encrypted client message is decrypted utilizing said ephemeral symmetric secret to authenticate said machine alias identifier.

7. The system of claim 1, where the session manager creates a session identifier and updates a session ledger and said machine alias identifier.

8. The system of claim 1, further comprising creating a session token and providing said session token and session parameters to at least one Sidecar module.

9. The system of claim 8, further comprising encrypting said session messages and transmitting said encrypted session messages, and a SAMI server alias identifier.

10. A method for secure communications, comprising: Secrets, Authentication, and Machine Identity (SAMI) server having one or more data encryption Sidecar modules; receiving a session message at said SAMI server or at said Sidecar module; receiving a machine dynamic element for at least one particular machine and at least one dynamic element comprising ephemeral public data element, where said ephemeral public data element is a data element taken from a public data source location; confirming said machine alias identifier and providing said machine alias identifier to a Codes Hidden In Plain Sight (CHIPS) module; instantiating said CHIPS module to create an ephemeral symmetric secret where said ephemeral symmetric secret is a symmetric encryption key built each time a session begins; decrypting said client message utilizing said ephemeral symmetric secret to authenticate said machine alias identifier; encrypting a session message with said ephemeral symmetric secret at the beginning of each data transmission session to optimize data transmission security; transmitting said session message utilizing said optimized data transmission security.

11. The method of claim 10, where said ephemeral public data element comprises an ephemeral symmetric secret comprising said machine dynamic data element and at least one ephemeral public data element.

12. The method of claim 11, where said machine alias identifier comprises a machine identity associated with a particular machine or device that is provided to said CHIPS module.

13. The method of claim 10, where each of said ephemeral public data components are created utilizing at least one public data source identified by a user for use in constructing a fixed character string.

14. The method of claim 10, further comprising utilizing said CHIPS module to encrypt said message.

15. The method of claim 14, where said encrypted message is decrypted utilizing said ephemeral symmetric secret to authenticate said machine alias identifier.

16. The method of claim 10, where the session manager creates a session identifier and updates a session ledger and said machine alias identifier.

17. The method of claim 10, further comprising creating an ephemeral session token and providing said session token and session parameters to a Sidecar module.

18. The method of claim 17, further comprising said Sidecar module encrypting said session messages and transmitting said encrypted session messages and receiving and decrypting said session messages using said session token.

* * * * *